Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 1

INVENTORS J. H. McGUIGAN
O. J. MURPHY
BY William F. Simpson.
ATTORNEY

INVENTORS J. H. McGUIGAN
O. J. MURPHY
BY William F. Simpson
ATTORNEY

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953

INVENTORS J. H. McGUIGAN
O. J. MURPHY
BY William F. Simpson.
ATTORNEY

Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 4

INVENTORS J. H. McGUIGAN
O. J. MURPHY
BY William F. Simpson.
ATTORNEY

Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 5

INVENTORS J. H. McGUIGAN
O. J. MURPHY
BY William F. Simpson.
ATTORNEY

INVENTORS J. H. McGUIGAN
O. J. MURPHY
BY William F. Simpson.
ATTORNEY

Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 7

INVENTORS J. H. McGUIGAN
O. J. MURPHY
BY William F. Simpson.
ATTORNEY

Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 8

INVENTORS J. H. McGUIGAN
O. J. MURPHY

BY William F. Simpson

ATTORNEY

INVENTORS J. H. McGUIGAN
O. J. MURPHY
BY William F. Simpson
ATTORNEY

Dec. 24, 1957 J. H. McGUIGAN ET AL 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

Filed Oct. 7, 1953 10 Sheets-Sheet 10

INVENTORS J. H. McGUIGAN
O. J. MURPHY
BY William F. Simpson
ATTORNEY 2,817,828

MULTIFREQUENCY HIGH SPEED SIGNALING SYSTEM EMPLOYING PULSES OF SIGNALING CURRENTS OF PREDETERMINED DURATION BASED ON ORTHOGONAL FUNCTIONS

John H. McGuigan, New Providence, N. J., and Orlando J. Murphy, New York, N. Y., assignors to Bell Telephone Laboratories, Incorporated, New York, N. Y., a corporation of New York Application October 7, 1953, Serial No. 384,752

12 Claims. (Cl. 340—171)

This invention relates to new and improved circuits, methods and apparatus for high speed electrical signaling capable of operating over voice frequency telephone communication channels including direct-current telephone communication channels, low frequency carrier current communication channels, high frequency carrier current communication channels, radio communication channels including high frequency radio communication channels. This invention operates over radio and carrier current communication channels which employ amplitude modulation, frequency modulation, phase modulation, as well as communication channels employing pulse modulation such as pulse length modulation, pulse time modulation, pulse code modulation, etc.

This invention relates to new high speed signaling systems for transmitting code groups of electrical manifestations such as, for example, as employed in telegraph signaling systems including printing telegraph systems. This signaling system may also be employed to advantage in transmitting signals from a telephone or telegraph subscriber's station to control the operation of automatic electromechanical or electronic switching equipment at a telephone or telegraph switching station to establish interconnections between calling and called stations including the passing of information between control circuits in the same and in different central offices or switching stations and in signaling over toll lines. In such applications, the higher signaling speed attainable effects a very large economy in the amount of switching equipment required to handle a given volume of calls.

More particularly, this invention relates to an improvement in the novel signaling arrangement disclosed and claimed in the copending application of C. A. Lovell, Serial No. 1,471, filed January 8, 1948, which issued as United States Patent 2,658,189 on November 3, 1953.

In that copending application the use of signaling currents having the properties of orthogonal functions is disclosed.

A set of normalized time functions, $\varphi^1(t)$, $\varphi_2(t)$ . . . $\varphi_n(t)$ are said to be orthogonal over the time interval $\tau$ if $$\int_0^\tau \varphi_i(t)\cdot\varphi_j(t)dt=0, i\pm j \qquad (1a)$$

$$(1)$$

$$\int_0^\tau \varphi_i(t)\cdot\varphi_j(t)dt=1, i=j \qquad (1b)$$

If such functions are used in signaling systems direct use of this property can be made for separation of the signals at the receiving point. Functions satisfying (1) may be used directly in the separation of signals at the receiving point without employing reactive filter networks.

Studies of the possibilities of using functions satisfying (1) for signaling have suggested an extension of (1) which defines a new set of properties that may prove to be more useful than those resulting from (1). Consider a set of functions $\theta_1(t),\theta_2(t)$ . . . $\theta_n(t)$ which over the time interval $\tau$, satisfy the conditions $$\int_0^\tau \theta_i(\lambda)\cdot\theta_j(\tau-\lambda)d\lambda=0, 1\pm j \qquad (2a)$$

$$(2)$$

$$\int_0^\tau \theta_i(\lambda)\cdot\theta_j(\tau-\lambda)d\lambda=1, i=j \qquad (2b)$$

Conditions (2) are not identical with (1). Functions exist which satisfy both (1) and (2). Other functions satisfy respectively (1) or (2) but not both. For want of a better description at present, conditions (2) will be regarded as an extension of the definition of orthogonality and functions satisfying (2) will also be called orthogonal. The practical importance, in the generation and reception of electrical signals, of functions which satisfy (2) is emphasized by pointing out the fact that the integral represents the response of a network, having an impulses response $\theta_1(t)$ to an applied signal of the form $\theta_j(t)$.

The above-identified Lovell patent application discloses the manner of implementing orthogonal functions in two signaling systems. The first system is based on functions satisfying (1). The second system is based on functions satisfying (2). In each case methods are used which are departures from conventional practices. In the mechanization of conditions (1) electronic computing elements are used in place of conventional filter networks for separating received signals. In the mechanization of (2) reactive networks are used but the instantaneous responses at particular times, rather than the steady state frequency characteristics, are used. The use of transient responses of networks in systems where signals are pulsed results in faster operation than may be realized by the more common methods of using steady state discrimination.

The present invention relates to improvements in the so-called second system disclosed in the above-identified Lovell application. In place of the electronic computing elements to perform multiplications, integrations, etc. under control of common control circuits in the first arrangement disclosed in said application the present invention, like the second system disclosed in said application makes use of the transient response of networks to convey and to detect or recognize the required intelligence.

Consider a set of five networks having impulsive responses given respectively by the time functions $G_1(t)$, $G^2(t)$, . . . $G_5(t)$, which satisfy the conditions of Equations 2*a* and 2*b* over a time interval $\tau$. Suppose a second set of identical networks is arranged for receiving as described in said application. The responses of the energized networks are respectively the functions $G_1(t)$, $G_2(t)$, . . . $G_5(t)$. These responses are added linearly and transmitted over the line. The signals may be transmitted by an automatic transmitting or keying mechanism such as described hereinafter. In the operation of the receiver described in detail hereinafter it is assumed that an automatic keying mechanism is employed.

At the receiving end of the line the received signals are applied to all the receiving networks. The response $I_{ij}(t)$ of the *i*th network to any signal $S_j(t)$ is $$I_{ij}(t)=\int_0^\tau G_i(\lambda)S_j(\tau-\lambda)d\lambda \qquad (3)$$

Let us consider signaling currents having a wave form which may be represented by $S_j(t)$ as given by $$S_j(t)=\sum_1^5 A_{\alpha j}G_\alpha(\tau) \qquad (4)$$

In thme exemplary embodiment of the invention described herein five different signaling functions or currents having five different frequencies are employed. These signaling functions are arranged in a code in which two of the signaling functions or currents are employed to represent each of the numerals 1 through 9 and zero. One such code is illustrated in the following table (5) wherein the values of $A_{\alpha j}$ (4) are shown:

| $j$ | $A_{1j}$ | $A_{2j}$ | $A_{3j}$ | $A_{4j}$ | $A_{5j}$ |
|---|---|---|---|---|---|
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

(5)

If now we substitute the values $S_j(t)$ in Equation 3, we get:

$$I_{ij}(t)=\int_0^\tau G_i(\lambda)\left[\sum_1^5 A_{\alpha j}G_\alpha(\tau-\lambda)\right]d\lambda \qquad (6)$$

Each integral (6) is seen to be the sum of two integrals of the type involved in conditions (2). If it is assumed that when evaluated over a time interval $\tau$ the G's satisfy conditions (2), then the fifty integrals (6) have their respective values given by the following table (7):

| $j$ | $I_{1j}$ | $I_{2j}$ | $I_{3j}$ | $I_{4j}$ | $I_{5j}$ |
|---|---|---|---|---|---|
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

(7)

In this case the multiplications and integrations indicated by the formulae for $I_{ij}(t)$ are performed by the networks in their responses to the sigals applied. The integration process starts at the time of arrival of the signal and if the value of the integral $\tau$ seconds later is to be observed the time of arrival of the signal must be noted by a start circuit which starts some sort of time keeper to inform the control circuit of the proper time to sample the response voltages of the receiving circuits.

In accordance with the present invention it has been discovered that if the individual resonant circuits of the two sets are effectively disassociated one from the other at the end of the integration interval $\tau$ then a receiving network tuned to the same frequency as a received alternating current will continue to have the alternating current flowing through it for a prolonged interval of time after the end of the integration interval $\tau$. On the other hand, those receiving networks tuned to other frequencies will have substantially no current flowing in them at the end of the time $\tau$ as set forth in said above-identified application and if these circuits are disassociated from the transmitting circuits at this time these other receiving resonant circuits will have substantially no current flowing in them thereafter.

It is, therefore, an object of the present invention to provide methods, systems, circuits and apparatus including means for energizing transmitting networks by transmitting the signaling manifestations for a predetermined interval of time to a receiving group of similar networks and at the termination of said interval of time to respectively disassociate said transmitting and receiving networks.

A feature of the present invention relates to methods, circuits and equipment for deenergizing the transmitting networks at the end of the predetermined interval of time $\tau$ which deenergization disassociates the receiving networks from the transmitting networks when these networks are coupled thereto by means of a voice frequency communication path of the type encountered in telephone switching systems.

A further feature of this invention relates to the use of one-way amplifiers in the signaling path which convey electrical manifestations from the transmitting network to the receiving network but do not convey any electrical manifastations from the receiving networks to the transmitting networks.

In accordance with the present invention the timing requirements for determining the output of the receiving networks are further relaxed by employing circuits for integrating the output of the resonant circuit for an interval of time after the termination of the received pulses. By employing applicants' improved receiving circuits responsive to currents flowing in the receiving network after the termination of the received signals in combination with the disassociation of the transmitting and receiving networks as described above, the required or necessary accuracy of the operation of the timing circuits at the receiving station has been reduced and the reliability and satisfactory operation of the system improved at the same time.

Certain communication channels, such as heavily loaded lines have appreciable phase or delay distortion so that the time of transmission of pulses of different frequencies varies appreciably. Thus, the time of transmission of the pulses of high and low frequency varies so that even though the pulses of two different frequencies are simultaneously transmitted, the pulses are not simultaneously received.

In accordance with the present invention wherein the timing requirements are relaxed due to the improved circuits and methods of operation thereof, provision has been made for allowing for appreciable phase or delay distortion so that satisfactory operation may be obtained even though the pulses of different frequencies representing an individual symbol or numeral may be received at appreciable different times. An object of the invention therefore comprises arranging the circuits and apparatus and method of operation thereof to permit receiving currents of different frequencies representing a symbol after different transmission delay intervals.

Other objects and features of this invention relate to improved receiving and control circuits which are relatively insensitive to noise.

A feature of the invention relates to receiving and control circuits which automatically and rapidly adjust themselves to different amplitudes of received signals.

A feature of the invention relates to receiving and control circuits wherein further differentiation between the output of receiving resonant circuits is obtained by employing the maximum amplitude of a current flowing in the receiving resonant circuits during the reception of signaling currents to control the bias of responsive electronic devices which devices are thereafter responsive to currents flowing in said resonant circuits after the termination of the received signals.

A feature of the invention relates to a calling arrangement wherein code groups of alternating-current signals representing called station identifications or other information are repeatedly transmitted.

A feature of the invention relates to transmitting equipment for automatically and repeatedly transmitting code groups of alternating-current signals of different frequencies representing calling designations wherein the code groups representing a single repetition of a complete called identification are separated by distinctive signals.

A feature of the invention relates to receiving method circuits and apparatus for selecting one repetition of a group of repeatedly transmitted alternating-current signals and registering the identity of the selected signals.

A feature of the invention comprises checking apparatus for checking each code group of received alternating-current code groups of signals and recycling the receiving equipment upon a predetermined response of said checking equipment to select another repetition of repeatedly transmitted code groups of alternating-current signals.

Another feature of this invention comprises a checking circuit wherein one response thereof in response to each code group of a plurality of code groups causes the receiving equipment to become disassociated from a receiving line.

Another feature of this invention relates to automatic checking and recording circuits for automatically counting and recording the number of properly received code groups of signals and for automatically counting and recording the number of improperly received signals representing a called station identification.

The foregoing and other objects and features of this invention may be more fully understood from the following description when read with reference to the drawing wherein details of an exemplary embodiment of this invention are set forth:

Figure 1:
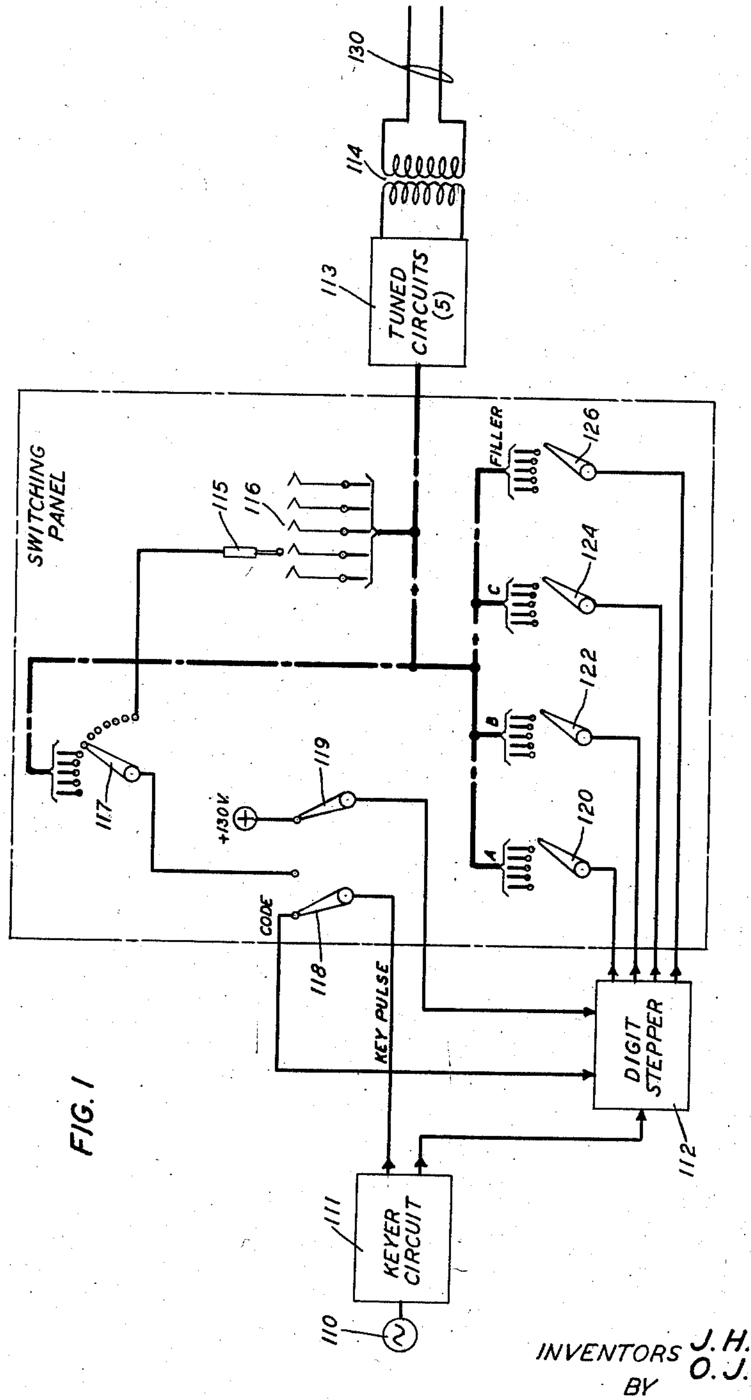
Fig. 1 shows in outline form various circuits and the manner in which they cooperate to transmit the desired signaling currents.
Figure 11:
Figure 12:
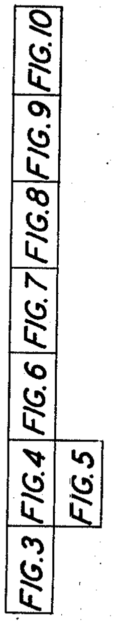
Figure 2:
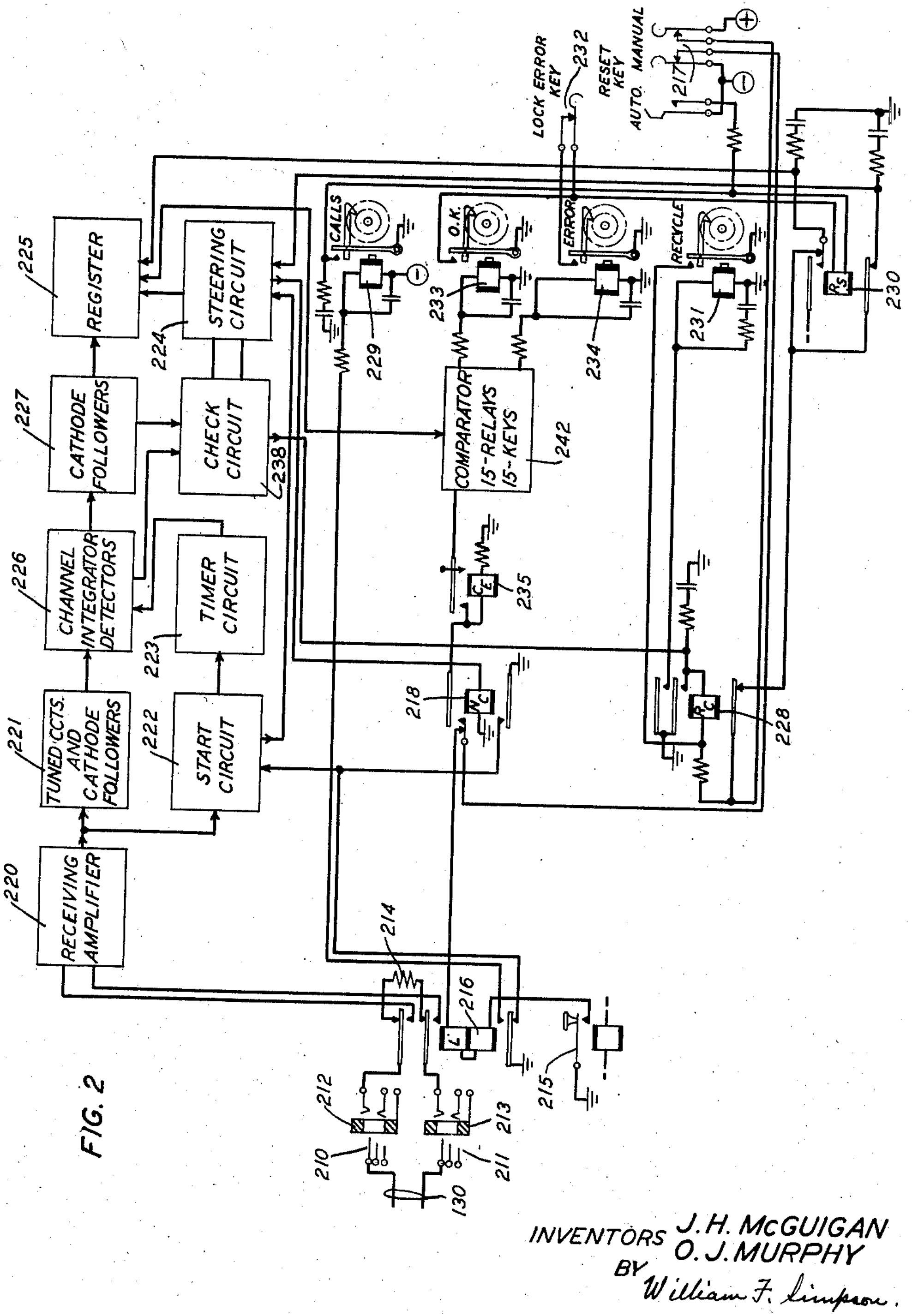
Fig. 2 shows the various circuits of a receiver and the manner in which these circuits cooperate in responding to received signaling alternating-current pulses transmitted from the circuits of Fig. 1.
Figure 3:
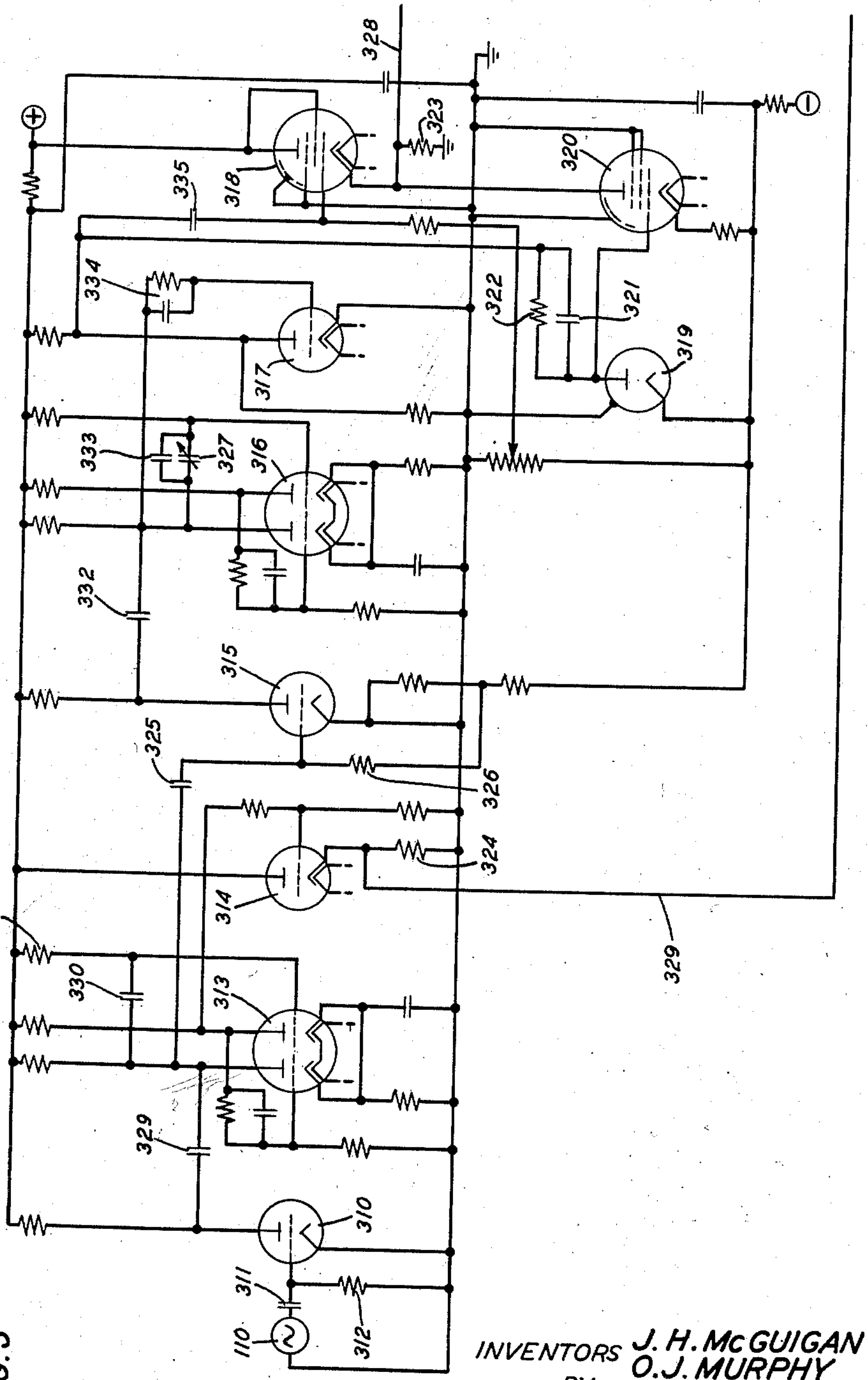
Figure 4:
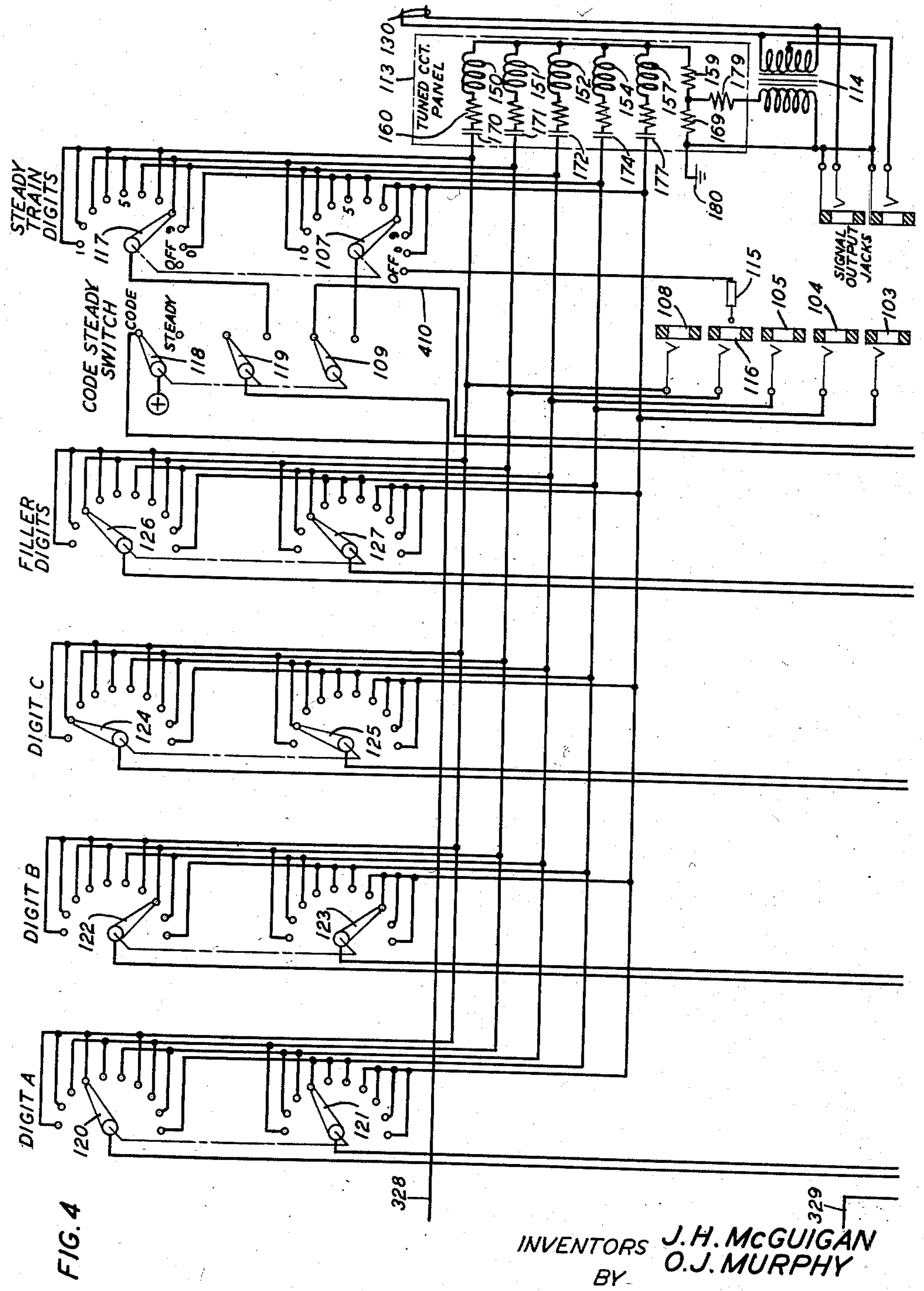
Figure 5:
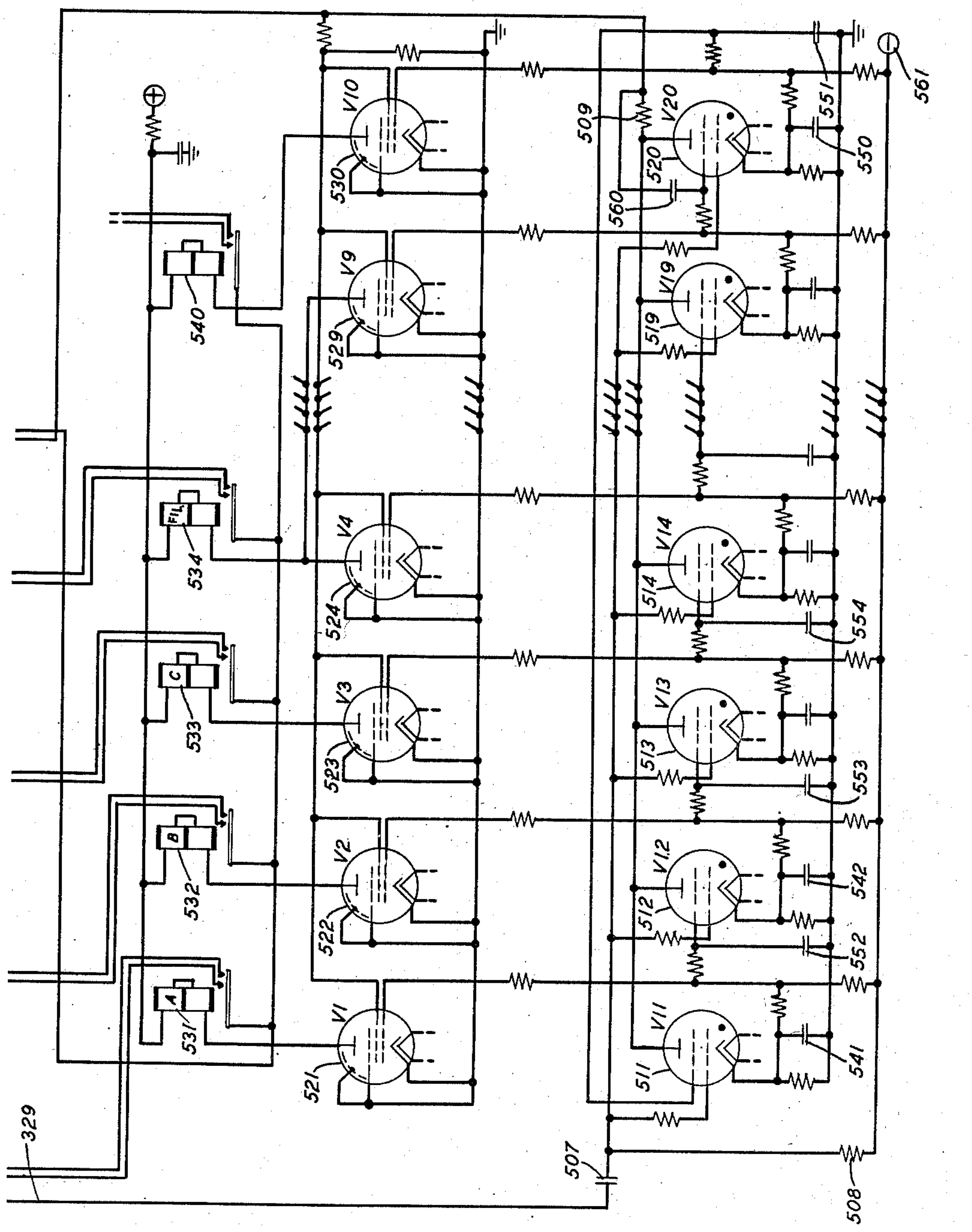
Figure 6:
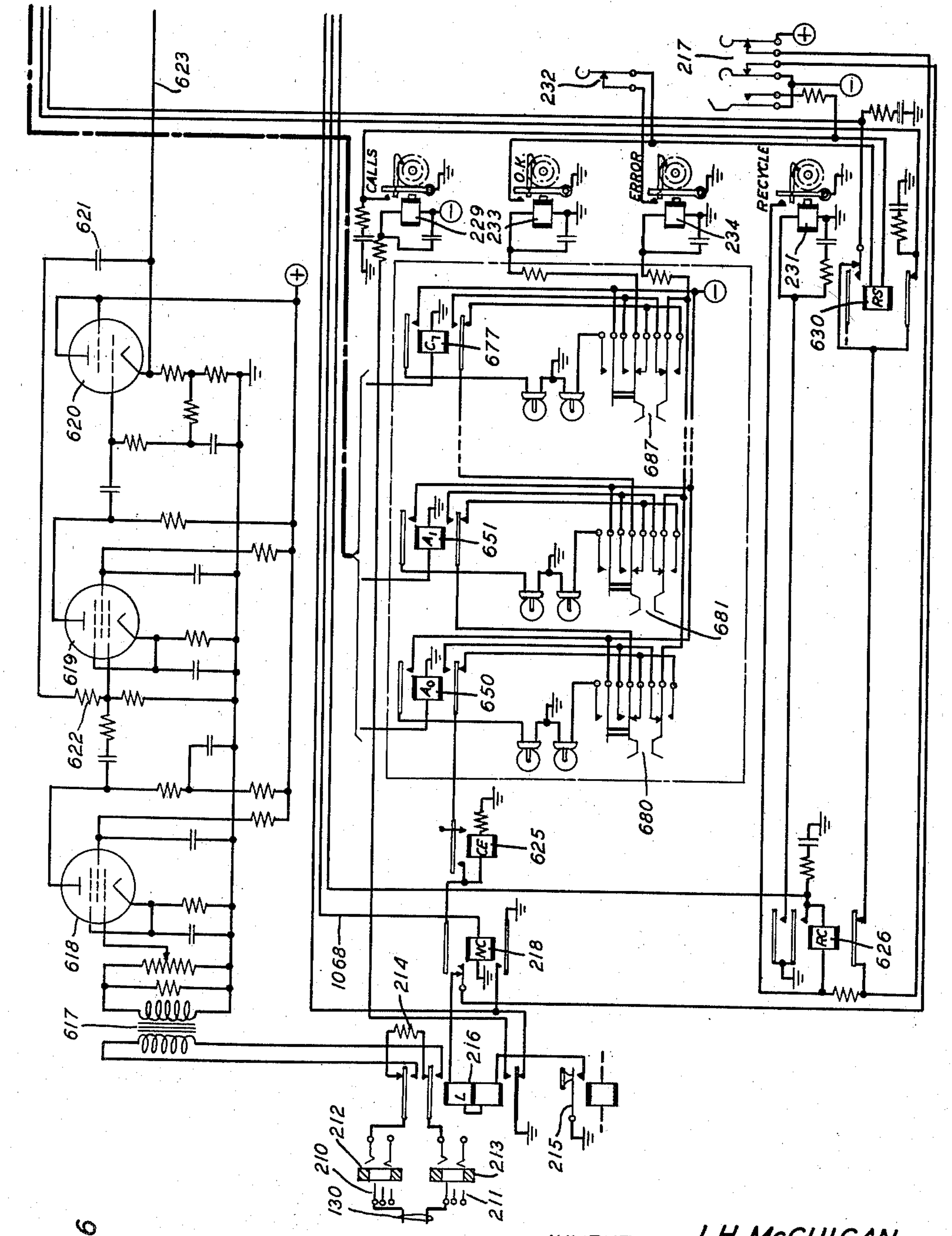
Figure 7:
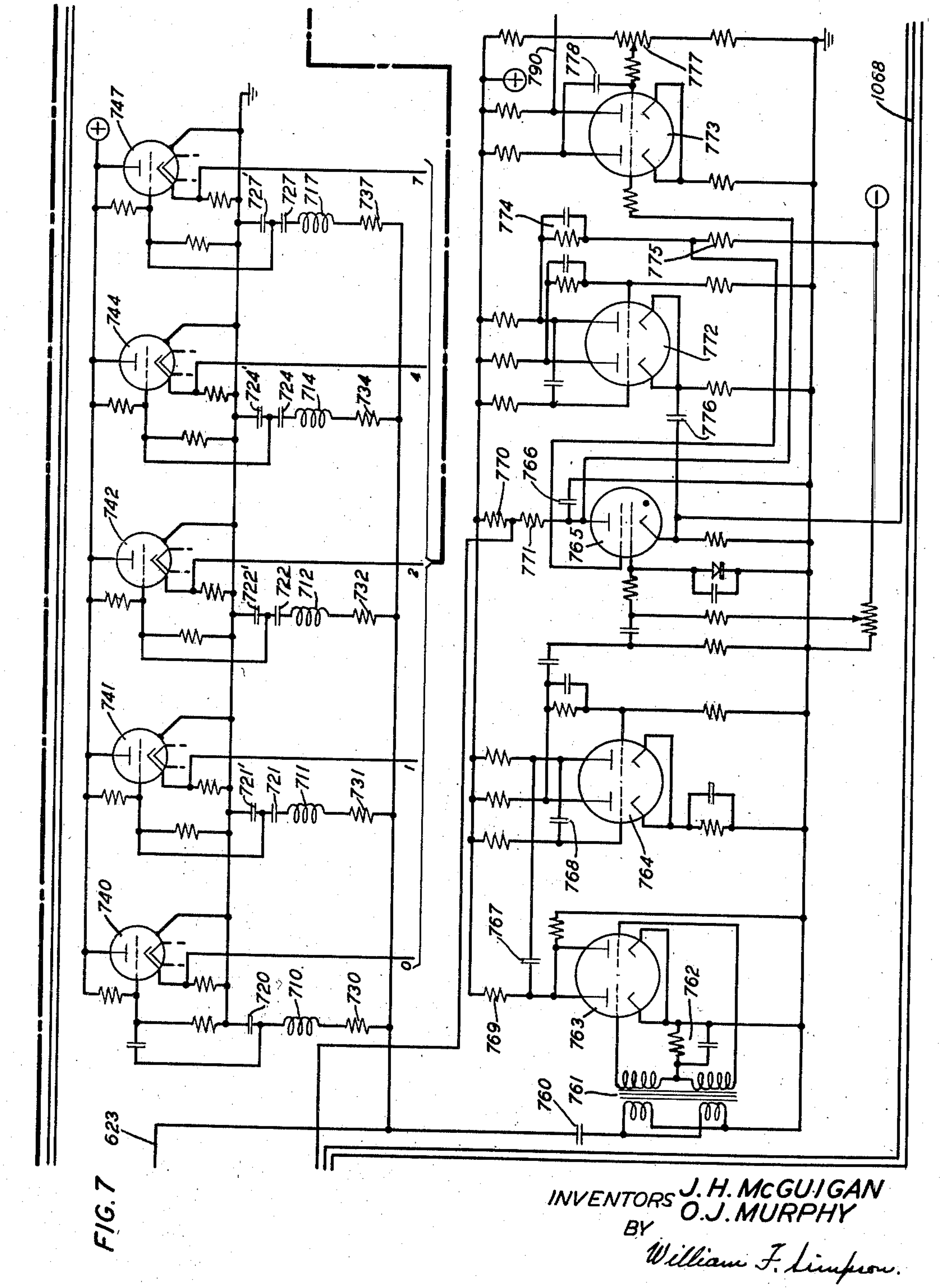
Figure 8:
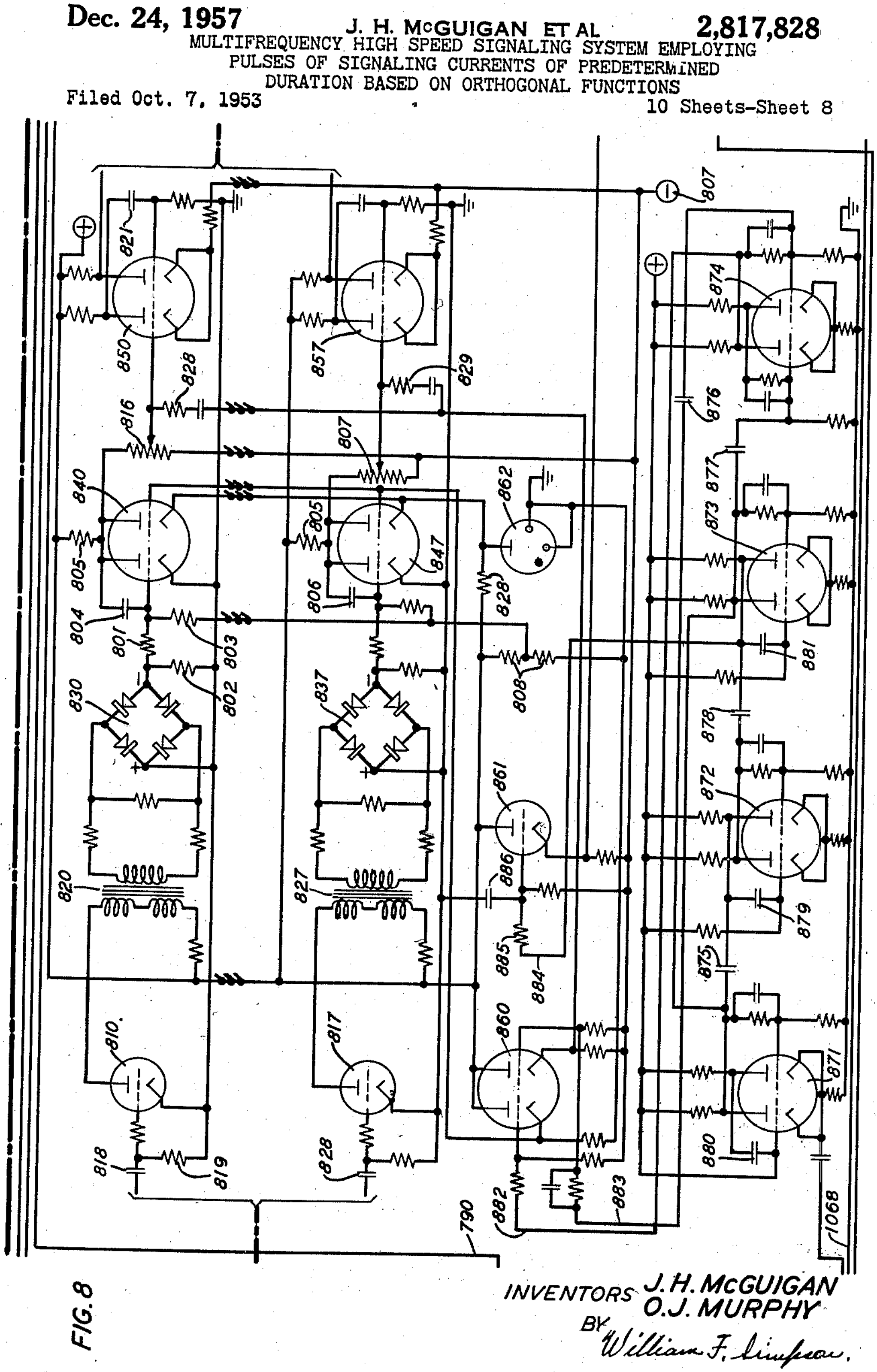
Figure 9:
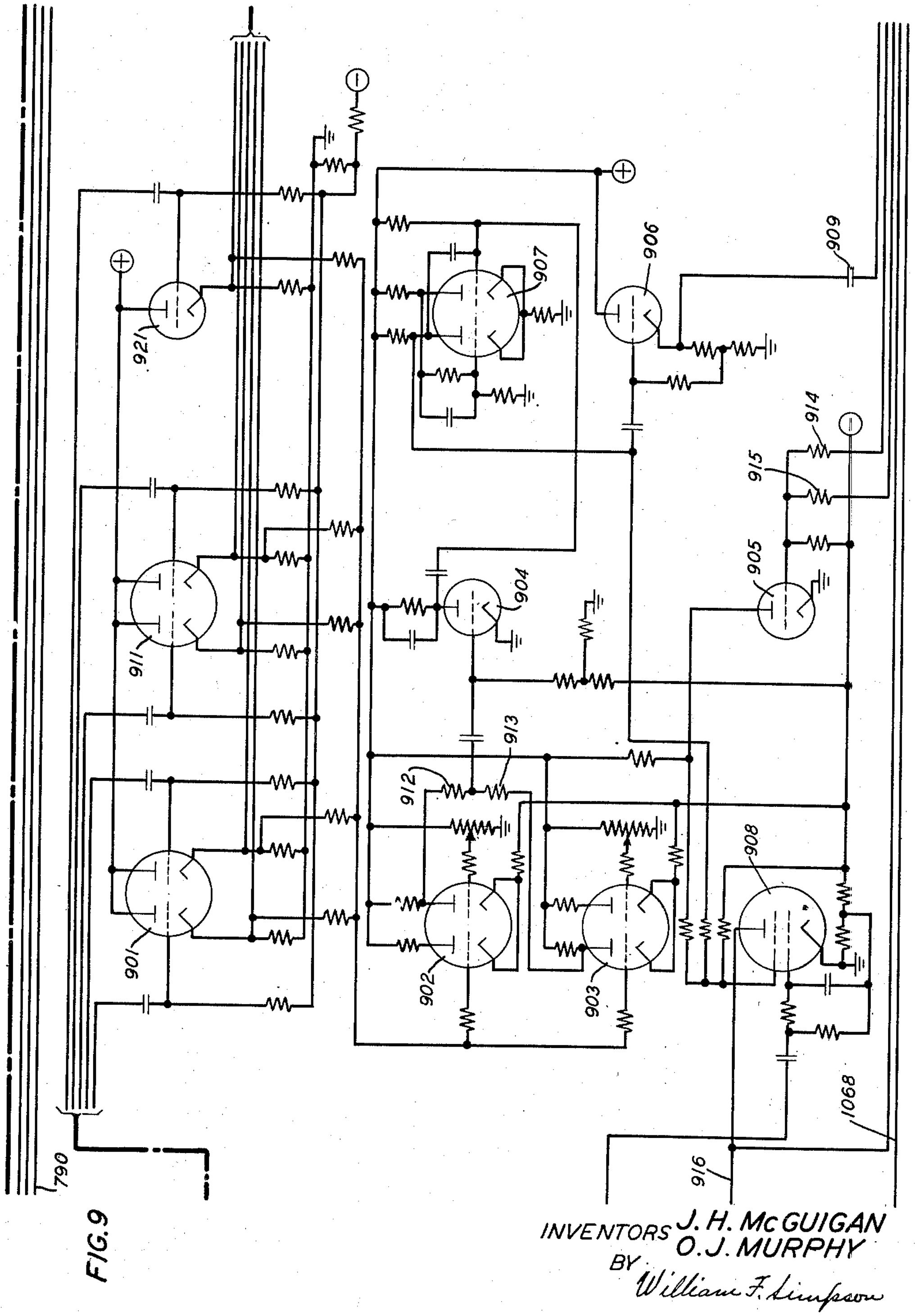
Figure 10:
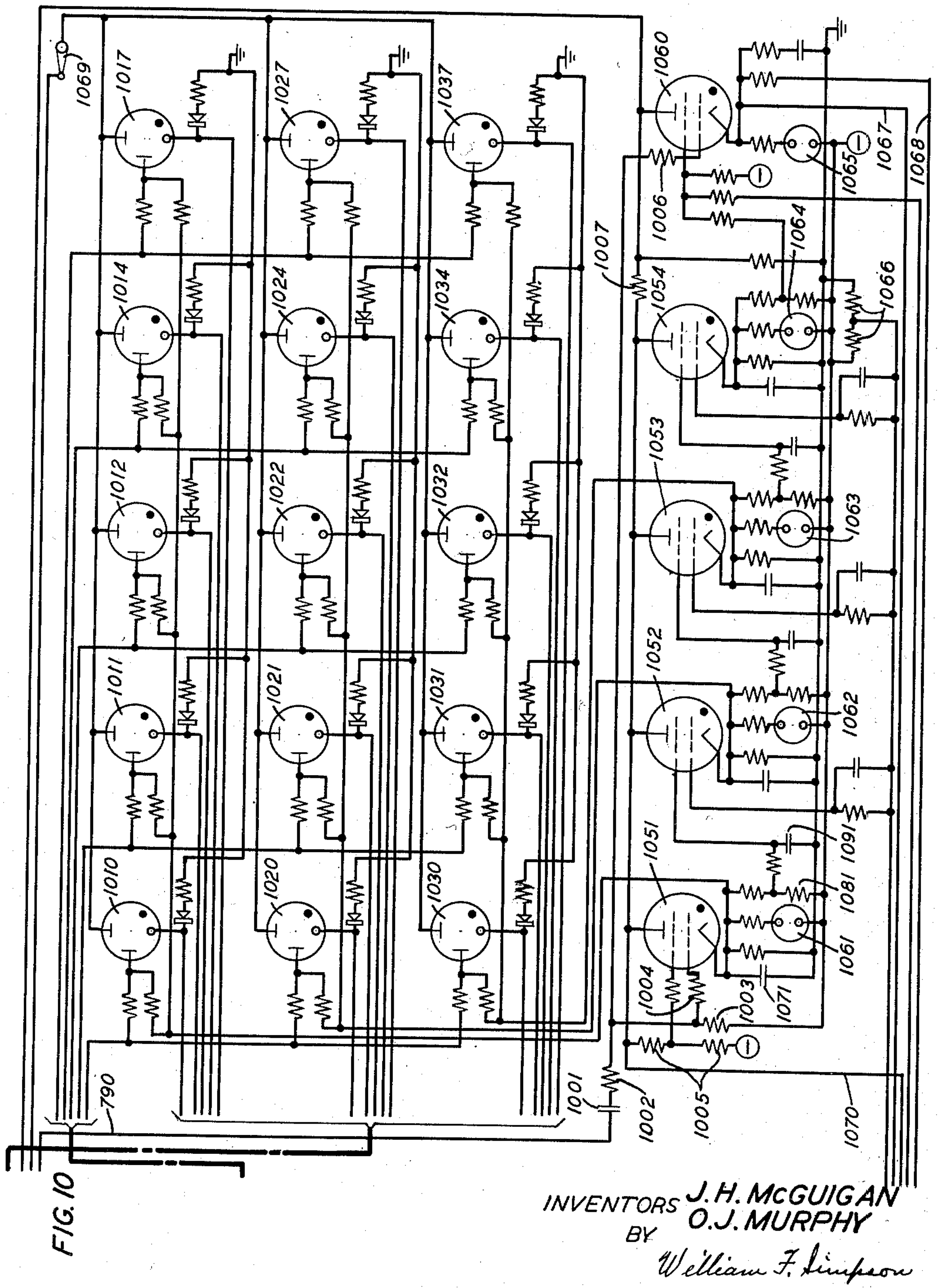

Figs. 3, 4 and 5 when positioned as shown in Fig. 12, show details of the transmitting circuits wherein:

Fig. 3 shows details of an exemplarly timing circuit arrangement;

Fig. 4 shows details of a suitable selecting arrangement for interconnecting various resonant circuits;

Fig. 5 shows the details of the distributing arrangement for successively interconnecting the selecting devices and resonant circuits of Fig. 4 to the timing equipment shown in Fig. 3;

Figs. 6, 7, 8, 9 and 10 when positioned as shown in Fig. 12 show details of a receiver embodying this invention wherein:

Fig. 6 shows a receiving amplifier and control circuits;

Fig. 7 shows the receiving resonant circuits and timing control circuits;

Fig. 8 shows detecting circuits, the integrating circuits and control circuits;

Fig. 9 shows interconnecting and checking circuits;

Fig. 10 shows a register circuit;

Fig. 11 shows the manner in which Figs. 1 and 2 are located adjacent to each other; and Fig. 12 shows the manner that Figs. 3, 4, 5, 6, 7, 8, 9 and 10 are positioned adjacent to one another.

While signaling arrangements in accordance with our invention operate equally well in combination with modified control circuits when a complete set of code groups of alternating currents representing called station identification or other calling information is transmitted once only, the exemplary embodiment set forth herein is arranged to repeatedly transmit complete sets of code groups of alternating-current signals of different frequencies, each complete set of which represents the called station. Each complete set of said signals are separated from other sets by means of a distinctive signal which may assume any suitable form, which in the exemplary embodiment described herein comprises a blank interval of predetermined minimum duration substantially equal to the time required for two code groups to be transmitted.

Likewise, the receiving equipment may be arranged in combination with modified control circuits to respond to signals which are transmitted only once. However, in the exemplary embodiment described herein in detail of our invention, the receiving equipment is provided with apparatus and circuits for responding to the distinctive signal, i. e., a blank interval, for selecting the subsequent set of code groups of signals representing the complete subscriber's designation.

Checking facilities are also provided in the receiving equipment and operate in combination therewith for checking each code group. If each code group comprises two and only two different signals of different frequencies for all of the code groups of a set representing a complete designation, then the receiving equipment is arranged to register the identity of each of these signals represented by the code groups and to disassociate itself from the receiving line. On the other hand, if more or less than two different signaling currents of different frequencies are received for any one of the code groups the receiving equipment is recycled and previously registered information cleared from the receiving registering equipment and another complete code group selected and recorded in the manner described above.

Auxiliary testing equipment is also provided, together with a manually operable key 217 which may be left in a neutral or "manual" position wherein the key must be manually operated to a reset position after each complete set of code groups is received. The key may also be operated to an "automatic" position where the equipment responds to each selected code group and checks the identity of each of the code groups of a set and if satisfactorily received in accordance with the predetermined test signals said set is counted as being received satisfactorily and the equipment recycled automatically to select and receive a succeeding set of signals of the repeatedly transmitted sets of signals. In addition, if any code group of any set is improperly received the equipment may be automatically recycled and the number of improper sets counted and registered. Alternatively, by reconditioning the checking and receiving equipment by proper setting of an additional key or switch, the automatic operation may be stopped upon the improper reception of any set of code groups representing a complete called designation. In this case it is necessary to manually reset the receiving equipment by operating the reset key or switch.

Referring now to Fig. 1 which shows the elements of an exemplary transmitter for use in combination with applicant's improved signaling system, 110 represents an oscillator for determining the rate at which signals are transmitted. The oscillator 110 supplies the timing frequency for the keyer circuit 111 which is arranged so that one signal or one set of signals representing a symbol or a character is transmitted for each cycle of the alternating current received from the source 110. In an exemplary arrangement of the invention ten signals or ten groups of signals are successively transmitted. Eight of these signals or groups of signals represent characters or symbols or numerals while two represent no characters, symbols or numerals and are employed to designate the beginning of each of said sequences of signals or groups of signals.

The keyer circuit 111 is arranged to supply two groups of pulses or signals, one for controlling a digit stepping circuit 112 and the other for supplying key pulses for shock-exciting one or more tuned circuits 113. The outputs of the tuned circuits are coupled through coupling transformer 114 to the line 130. From line 130 the signals are transmitted to a distant or receiving circuit as shown in Fig. 2.

A group of switches is provided to select the various tuned circuits. Thus, for each pulse supplied to the digit stepping circuit 112 a circuit is completed through the digit stepping circuit to one of the switches 120, 122, 124 and 126. Four such switches are shown but any suitable number such as eight or ten in the exemplary embodiment described herein may be provided. Each switch is employed to apply the key pulse to two of the tuned circuits. In the exemplary embodiment as described herein two out of five of the tuned circuits are shock-excited to represent each numeral. A switch 120 which is shown as a single arm switch in Fig. 1 but comprises switch arms 120 and 121 as shown in Fig. 4 is employed to select the two frequencies representing the first character or symbol, Switch 122 of Fig. 1 which comprises switch arms 122 and 123 of Fig. 4 select the tuned circuits which are shock-excited to represent the second character or number. Each of the succeeding switches selects the same or other of the tuned circuits to represent each of the succeeding symbols or numerals. A pair of switches 118 and 119 in Fig. 1 and 118, 119 and 109 of Fig. 4 are employed to change the transmitting circuits so that each of the selector switches 120, 122, 124, 126, etc. control the signals to be transmitted. With the switches 118, 119 and 120 set in their alternate positions, then the switches 120, 122, 124 and 126 no longer select the signal transmitted. Instead, switch 117 and switch 107 select signals to be transmitted wherein these same signals are transmitted during each signaling interval and thus comprise transmitting the same signals over and over again. As shown in Fig. 4, switches 117 and 107 comprise a gang switch and cause two of the five tuned circuits to be selected depending upon the setting of the switch. In case it is desired to transmit only one frequency and thus select only one of the tuned circuits during each signaling interval, switch arms 107 and 117 will be set in their zero positions and the particular tuned circuits selected for transmission of a single frequency selected by means of the plug 115 in jack 116.

Thus, by applying power to the various circuits they are set into operation and cause either the single frequency or groups of frequencies to be transmitted during each of a plurality of successive signaling intervals. Each of the tuned circuits which is selected and shock-excited causes a corresponding frequency to be transmitted over the signaling conductor 130 to a distant receiving point.

The call transmitting arrangements as described herein are suitable for use in combination with the switching and control circuits such as disclosed in Patent 2,598,695, granted June 3, 1952, to Hill-Parkinson and in the patent application of Dunlap and Malthaner, Serial No. 116,068, filed September 16, 1949, which issued as United States Patent 2,672,523 on March 16, 1954, and the patent application of Malthaner and Vaughan, Serial No. 115,961, filed September 16, 1949, which issued as United States Patent 2,655,559 on October 13, 1953. The call transmitting arrangements in accordance with this invention may be also incorporated in signaling arrangements controlled by operators or attendants at the central switching stations. In these various arrangements the calling signals are repeatedly transmitted as long or as often as may be desired under control of the various control and switching circuits, including the control, over subscriber's lines, of the transmission of the signals or from a subscriber's or outlying station by the switching equipment at the central switching station.

The signaling conductors 130 represent any suitable type of communication path capable of transmitting suitable frequencies including the usual low frequency or voice frequency communication paths or channels, carrier current communication paths or channels, and radio channels including channels of the very shortest radio waves having semioptical properties. This communication path may include any combinations of the enumerated paths or channels and also the usual terminal amplifying interconnecting equalizing regulating alarm, etc., equipment which may be provided for such channels or combinations of channels. Such equipment and channels or combinations of channels operate in their normal and usual manner in combination with the other elements of the exemplary embodiment of applicants' system described herein.

The communication channels represented by conductors 130, at the receiving terminal at the central office, normally terminate in either automatic or semiautomatic, or manual switching equipment. Upon the initiation of a call the switching equipment causes a register or receiving device in combination with the register to be either manually or automatically associated with a receiving path. Such switching equipment is represented by plugs 210 and 211 and jacks 212 and 213 in Fig. 2. These plugs and jacks represent both manual and automatic switching equipment and are employed to associate the receiving equipment with conductors 130 over which the signals are transmitted from Fig. 1 to Fig. 2. The switching equipment employed operates in its normal and usual manner in interconnecting the incoming conductors with the receiving equipment. One such switching arrangement is disclosed in a patent application of Malthaner-Vaughan, Serial No. 115,961, filed September 16, 1949, which issued as United States Patent 2,655,559 on October 13, 1953.

As shown in Fig. 2 and in Fig. 6, the incoming conductors of path 130 are normally terminated in a terminating resistor 214. However, upon seizure of the receiving equipment shown in Fig. 2, contacts 215 will be closed either manually or by means of automatic switching equipment and complete a circuit for the operation of relay 216 from battery through the lower right-hand normal contacts of key 217 to the upper break contacts of relay 218, windings of relay 216 to ground through the operated contacts 215. The operation of relay 216 transfers the incoming signaling path from the terminating resistor 214 to the receiving amplifier 220.

From the receiving amplifier 220 the signals are applied both to the tuned circuits 221 and also to the start circuit 222. The start circuit in turn initiates the operation of the timer circuit 223 and conditions the steering circuit 224. The steering circuit in turn conditions the register circuit 225 and the timer 223 after a suitable interval of time causes the channel integrator and detector circuits 226 to respond to the output of the tuned circuits 221. The output of the integrator circuits 226 together with the output of the cathode followers 227 control a check circuit 238 so that if each code group of signals is properly received register circuit 225 will be actuated to record the signals. If it is improperly sent or received, the register circuit will not be actuated. Instead, the receiving equipment will be recycled by the operation of the recycle relay 228.

The operation of relay 216 in addition to transferring the circuits for signaling conductors of path 130 to the receiving amplifier 220 also removes ground from a conductor extending to the start circuit thus conditioning the start circuit to respond to incoming signals. The operation of relay 216 in addition completes an obvious circuit for the operation of the call message register 229 to count and register the number of attempts to receive signals. Operation of the call message register 229 applies ground to the lower winding terminal of the reset relay 230 and thus diverts the current from the battery supply to this winding terminal in case the manually operable key 217 is operated to its automatic position.

If during the subsequent operation of the receiving circuit the checking circuit fails to complete a satisfactory check of any group of received signals the recycle relay 228 is operated, which relay is operating completes the circuit for operating the recycle message register 231. The relay 228 in operating also locks operated under control of the message register 231 so that upon the operation of the recycle message register 231 the battery supply to the winding of relay 228 is shunted with the result that relay 228 releases and in turn releases the recycle message register 231.

The operation of the recycle relay 228 also removes battery from the register circuit 225 thus releasing the register circuit and clearing the register circuits of all previous register digits for information. The operation of the recycle relay 228 also removes battery from the steering circuit 224 thus restoring this circuit to its initial condition. Consequently, upon the release of the recycle relay described above the register circuit 225 and the steering circuit 224 are conditioned as at the beginning of a call so that they will respond to subsequent repetition of the received signals in the normal manner.

If the check circuit 238 satisfactorily checks each of the numerals or symbols of the received designation the corresponding signals are registered in the register circuit 225 and the steering circuit 224 advances until signals representing all the numerals of a designation have been received. Upon the satisfactory completion of the reception of a complete station designation the number complete relay 218 is operated from the steering circuit 224. Relay 218 in operating interrupts the above-described circuit for the operation of relay 216 and completes the circuit for the operation of relay 235. The release of relay 216 disconnects the incoming line conductors 130 from the amplifier 220 and reconnects the incoming path to the terminating resistance 214 therefore. In addition, the release of relay 216 interrupts the circuit to the call register 229. This register however, is slow to release and does not immediately release.

The operation of relay 218 also applies ground to the start circuit 222 thus returning this circuit to normal and preventing it from responding to further repetitions of the received signals.

A group of comparator relays and keys represented in Fig. 2 by rectangle 232 has been provided. These keys and relays are also shown in Fig. 6. The keys are designated 680, 681, 687 and relays 650, 651 and 677. The comparator keys and relays are provided to permit checking of the operation of the receiving circuit. Four of these relays and four of the keys are provided for each of the digits or symbols of called station designations to be checked. When the expected designation is known as in the case of test signals, the comparator keys 680, 681, 687, etc. will be set in accordance with the expected designation of the test signals. Then upon the reception of the signals the comparator relays 650, 651 and 657 are actuated in response to the received signals as described herein and if the operation of the relays corresponds to the setting of the keys then a circuit will be completed for the operation of a satisfactory or O. K. call register 233, whereas if anyone of the settings of the relays and keys differ then a circuit is completed for the operation of an error register 234. As described herein the actuation of these registers together with other control circuits may be employed to provide an automatic or routine test arrangement for causing the circuits to repeatedly respond to incoming signal groups and to register the number of correct operations as well as the number of errors, which errors may be due to noise and other interference.

The circuit for the operation of relay 235 extends from battery through the lower right-hand break contacts of key 217 and the upper operated contacts of relay 218 to ground through the windings of relay 235. Relay 235 is slow in operating so that the comparator relays 232 have ample time to operate under the control of the register before relay 235 operates. After a sufficient time interval to allow all of the comparator relays 232 to be operated under control of the register 225 to represent the signals received by the register, relay 235 operates. If the comparator circuit 232 satisfactorily checks the received signals the O. K. message register 233 is operated. The O. K. message register 233 in operating applies ground to the upper winding terminal of relay 230 thus causing relay 230 to operate after relay 229 has released as described above. The operation of the O. K. message register records the satisfactory reception and satisfactory response of the receiving circuits. Upon the release of the message register 229 as described above the circuit for the operation of relay 230 extends from battery to the lower left-hand operated contacts of key 217 (assuming key 217 to be operated to its automatic position where the lower left-hand contacts are closed), winding of relay 230 to ground through the operated contacts of the O. K. register 233.

In case the complete designation did not correspond with the expected designation, the comparator relays would cause the error register 234 to operate instead of the O. K. register 233. The operation of the error register 234 at this time again completes a similar circuit for the operation of relay 230. If it is desired to stop the operation of the system when an error is received, then the key 236 is operated so that the relay 230 does not operate in response to the operation of the error register 234. Under these circumstances it is necessary for the operator to manually restore the circuits to their initial condition by momentarily interrupting the battery supply by actuating the key 217 to open the right-hand contacts thereof.

The operation of relay 230 interrupts the battery supply to the steering circuits and register circuits and thus restores these circuits to their initial condition. As a result, registers 233 and 234 are released and in turn release the relay 230 with the result that the circuits are restored to their initial condition. They are then ready to respond to a succeeding repetition of the signals or to any other signals received over the conductors 130. In addition, the restoring of the steering circuit 224 causes relay 218 to release and in turn releases relay 235.

The signal detecting arrangements described herein are satisfactory for recognizing the presence of one or more alternating currents or signals having alternating-current components of a plurality of predetermined different frequencies.

In the exemplary embodiment described herein in detail the information is transmitted by means of code groups of currents of such frequencies in accordance with the well-known two-out-of-five code. When such an arrangement is used it is desirable to have the transmitting and receiving networks associated or interconnected for a given interval which is the same for all of the various networks; it is also desirable that the oscillating currents in the receiving networks having frequencies different than the received signal frequencies all be substantially zero at the end of this time interval. One way of devising such a system is to select a suitable value for the time during which the transmitting and receiving networks are associated together and then select the transmitting frequencies as some multiple of the reciprocal of this time interval. One suitable embodiment of this invention uses signaling frequencies of 500, 700, 900, 1100 and 1300 cycles per second which are odd multiples of 100-cycle frequency. Other frequencies in the same or different frequency regions may be employed. Such arrangement allows ten milliseconds per digit. Five of these milliseconds may be employed for sending the signaling frequencies and the other five for necessary switching and control functions as described hereinafter. The currents in the resonant circuits having frequencies different than the received signal frequencies will be substantially zero at an instant five milliseconds after the arrival of the signals and by interrupting the circuit connection between the two sets of networks at this time, the currents in such networks remain substantially zero, while in networks having frequencies which are the same as the frequencies of the currents of the received signals, oscillating currents of diminishing amplitude continue to flow for an appreciable interval of time. These oscillating currents, as manifested by voltage across the condenser element of the network, are then integrated and employed to actuate register circuits.

Figs. 3, 4 and 5 when arranged as shown in Fig. 12 show details of exemplary circuits represented in Fig. 1 which are suitable for generating and transmitting signaling pulses in accordance with the present invention. Fig. 3 shows the keyer circuits represented by rectangle 111 of Fig. 1, Fig. 5 shows exemplary circuits of a typical digit stepping arrangement represented by rectangle 112 of Fig. 1 and Fig. 4 shows the detailed circuits of the switching and selector panel as well as the tuned circuits and coupling transformer 114.

The oscillator 110 may be of any suitable type including vacuum oscillators, electromechanical alternators, transistor oscillators and may also include crystal-controlled oscillators of high frequency stability.

The output of the oscillator 110 is coupled through a coupling network comprising condenser 311 and resistor 312 to the grid of tube 310. The condenser 311 which is charged by grid current of tube 310 and which discharges only slowly through resistor 312 provides a high negative bias for the grid of tube 310 so that the tube conducts for only a short portion of each of the positive half cycles of the alternating current from the oscillator or source 110. These short pulses of current cause a voltage drop across the anode resistor of this tube with the result that a negative pulse is applied to the left-hand anode and right-hand grid of tube 313 through the respective coupling condensers 329 and 330.

The two sections of tube 313 are arranged in a single cycle multivibrator circuit such that the right-hand section is normally conducting. Each negative pulse from the anode of tube 310 applied to the left-hand anode of tube 313 through the coupling condenser 329 and then through the coupling condenser 330 to the grid of the right-hand section of tube 313 interrupts the current flowing through the right-hand section of this tube and causes current to flow through the left-hand section of this tube. A short interval of time later determined principally by the values of condenser 330 and resistor 331 the discharge through the left-hand section of tube 313 is interrupted and the flow of current through the right-hand section of this tube is restored. In an exemplary embodiment of this invention the time interval of the flow of current through the left-hand section of tube 313 has been arranged to be of the order of six milliseconds while the oscillator 110 is set for a frequency of 100 cycles per second.

The anode of the right-hand section of tube 313, which thus is at its most positive voltage for approximately six milliseconds during each ten-millisecond cycle of the alternating current from source 110, is connected to the control grid of tube 314 and applies a positive pulse of six milliseconds duration over said control grid of tube 314. Tube 314 operates as a cathode-follower tube and repeats a positive pulse of approximately six milliseconds duration over conductor 329 which conductor extends to the digit stepping circuit. Coupling condenser 507 and resistor 508 in this latter circuit in effect differentiate this positive pulse and apply a positive pulse of short duration at the beginning of each of these pulses to all of the control grids of the gas discharge tubes 511 through 520, inclusive. A negative pulse is also applied to these control grids at the termination of each of the six-millisecond pulses received over conductor 329 from the cathode of tube 314.

The tubes 511 through 520, inclusive, of Fig. 5 are arranged in a reentrant stepping chain or ring circuit with each screen connected via a condenser-resistance network to the cathode of the preceding tube in the chain or ring. In addition, cathode condensers 541 through 550, inclusive, are connected from ground to respective cathodes of these tubes. These condensers, together with the common anode resistor 509, insure that the initiation of a discharge through any one of the tubes will extinguish a discharge through any other of the tubes which may have discharging current flowing in their anode-cathode circuit at the time of the initiation of the new discharge. The biasing voltages normally applied to the screens of these tubes as well as the magnitude of the differentiated voltage applied through the coupling condenser 507 to the control grids of these tubes is such that the application of the voltage pulses through the condenser 507 is insufficient to initiate a discharge through any of the tubes.

When power is first switched on to the system a high positive voltage is momentarily applied to the screen of some one of the tubes such as tube 520 through the screen by-pass condenser 560 which is connected to the source of positive anode voltage instead of to ground as are all the other screen by-pass condensers 551, 552, etc. These screen by-pass condensers are provided to prevent false stepping of the tubes due to extraneous voltages, fields and other interferences. The connection of the by-pass condenser 560 to the anode voltage source rather than to ground does not in any way interfere with the above-described action of these condensers in preventing false stepping or operation of the tubes. It does, however, suffice to initiate a discharge in that one tube with which it is associated.

With anode-cathode current flowing in tube 520 the cathode of this tube is raised to a relatively high positive voltage so that the cathode condenser 550 likewise becomes charged. This condenser is coupled through coupling resistors to the screen or other control element of tube 511 and quickly raises the voltage of this screen sufficiently so that upon the application of the next differentiated positive pulse applied through the coupling condenser 507 a discharge will be initiated through tube 511. This discharge current flows through the common anode resistor 509 and reduces the anode voltage of tube 520 below the voltage of the upper terminal of condenser 550 thus extinguishing tube 520. The charge on or the voltage across condenser 541, however, does not change appreciably instantly so the cathode of tube 511 is only slightly positive with respect to ground as its discharge begins. Hence, the current flowing through the common anode resistor 509 is not sufficient to reduce the voltage of the anode of tube 511 below the voltage of the upper terminal of condenser 541 so the discharge continues to flow through tube 511.

Within a short time the discharge current flowing through tube 511 causes the upper terminal of condenser 541 to now become charged to a high positive voltage which voltage is coupled to the screen or other control grid of tube 512 so that upon the reception of the next positive differentiated pulse through condenser 507 a discharge is initiated through tube 512, the current of which also flows through the common anode resistor 509 and reduces the anode voltage of tube 511 below the voltage which the upper terminal of condenser 541 has now attained with the result that the discharge flow through tube 511 is extinguished. Thus, each positive pulse received through the coupling condenser 507 causes discharge current flowing through one of the stepping tubes 511 through 520 to be interrupted and causes a current to be initiated in the succeeding tube.

The cathode of tube 511 is also coupled to a control element of tube 521. In a similar manner, each of the succeeding tubes 512 through 520 is likewise connected to a control element of the corresponding succeeding tubes 522 through 530. Each of the tubes 521, 522, 523 and 530 as shown in Fig. 5 has the corresponding relays 531, 532, 533 and 540 connected in its anode circuit. As shown in Fig. 5, the tubes 524 through 529 inclusive, have a single relay 534 connected in their anode circuits. The arrangements shown in Fig. 5 are provided for test purposes wherein any desired code may be transmitted for the first three digits and then a single code for the next succeeding five digits followed by a pause or blank interval. If it is desired to transmit any or all of the possible codes or calling designations then each of the tubes 524 through 529 will be provided by the relay individual to these tubes which relay will be individually connected in their anode circuits. The contacts of these relays will be connected to switches similar to the switches 120 and 127 of Fig. 4 in such a manner that suitable signals representing the desired digits or symbols in each place may be selected and transmitted.

Normally, each of the tubes 521 through 530 is biased so that it is not conducting. The control elements of these tubes are connected to the cathodes of the correspondings tubes 511 through 520. When a discharge flows through any one of the tubes 511 through 520 as described above the cathode of this tube is at a more positive potential with the result that the corresponding tubes 521 through 530 conduct or pass sufficient current to operate the corresponding relays 531 through 540. Consequently, during each cycle of current flow from the source or oscillator 110, one of the tubes 511 through 520 has a discharge initiated through it. Consequently, the corresponding one of the tubes 521 through 530 permits sufficient current to flow in its anode cathode circuit to operate one of the relays 531, 532, 533, 534 and 540 as shown in Fig. 5. If one of the relays 531 through 540 has been provided individual to each of the tubes 521 through 530 then the corresponding relay will be operated during each cycle of the alternating current from the source or oscillator 110. If it is desired to transmit the pause or blank interval two signaling intervals between the successive groups of signals representing a complete subscriber's designation, then the last two relays 539 and 540 and the last two tubes 529 and 530 need not be provided or need not be connected. However, tubes 519 and 520 must be provided and connected to count the signal intervals which determine the length of the blank interval.

Likewise, if it is only desired to transmit the first few digits as for example, the first three digits then it is only necessary to provide the first three tubes 521, 522 and 523, together with the corresponding relays 531, 532 and 533. However, all of the control tubes 511 through 520 must be provided. Further, if it is desired to transmit only a portion of the signals or some other group of signals then the corresponding tubes 521 through 530 and corresponding relays 531 through 540 must be provided and connected.

The duration of the pulse as determined by the single cycle multivibrator tube 313 is adjusted so that ample time is provided between the beginning and ending of the pulse determined by this tube to insure that the relays 531, 532, etc. have sufficient time to become fully operated before the end of the pulse which is used to initiate another action, hereinafter to be described. If the relays require more than approximately six milliseconds then the multivibrator circuits and the particular condenser 330 and resistor 331 will be adjusted to time a longer pulse. On the other hand, if the relays require less time, then the constants of the single cycle multivibrator circuit may be adjusted to generate a shorter pulse. In any case each relay 531, 532, etc. remains operated for substantially a full cycle of the applied alternating-current timing wave from source 110 and does not release appreciably before the next succeeding one of these relays operates.

The termination of the pulse from the single cycle multivibrator 313 occurs when the right-hand section of tube 313 again starts to conduct which causes the voltage of the right-hand anode to become low, thus reducing the higher positive voltage applied to lead 329. The condenser 507 and resistor 508, in effectively differentiating this voltage, apply a negative voltage pulse at this time to a control element or grid of tubes 511 through 520, inclusive, but this negative voltage pulse does not disturb discharge current flowing through any of the tubes nor does it initiate the discharge of a current through any of the other tubes 511 through 520.

The left-hand anode of tube 313 is coupled through a differentiating network including condensers 325 and resistor 326 to the control element of the repeating tube 315. Thus, when the negative pulse from the anode of tube 310 is applied to the left-hand anode of tube 313 when current starts to flow through this tube the negative pulse is applied through the coupling condenser 325 to the control element of tube 315. Tube 315 is normally biased negative so that very little current flows in the anode-cathode circuit. Consequently, the application of the negative pulse to its grid at this time will produce only a very small output pulse. This pulse is coupled to the left-hand anode of the multivibrator tube 316 and is of a positive polarity so that it produces substantially no effect upon the circuits of tube 316.

The two sections of tube 316 are connected in a single cycle multivibrator circuit in which the right-hand section is normally conducting and the left-hand section normally non-conducting. At this time the application of a positive pulse to the left-hand anode of this tube and then through the coupling condensers 327 and 333 to the control element of the right-hand section of this tube produces substantially no effect upon the conduction within either section of this tube or upon the circuits controlled by the tube.

At the end of the pulse timed by the single cycle multivibrator tube 313 and after one of the relays such as 531 has had ample time to operate, the conduction through the right-hand section of tube 313 is restored and the conduction through the left-hand section of this tube interrupted with the result that the voltage of the anode of the left-hand section rises to substantially the anode supply voltage and applies a positive pulse of short duration through the differentiation of condenser 325 to the control element of tube 315. As a result, a pulse of current of appreciable magnitude flows in the anode-cathode circuit of this tube and causes the anode voltage of the tube to fall momentarily to a relatively low value. Consequently, a negative pulse is applied through the coupling condenser 332 to the left-hand anode of tube 316 and then through the coupling condensers 327 and 333 to the right-hand control element of tube 316. As a result, the current flowing through the right-hand section of tube 316 is interrupted and the flow of current through the left-hand section of this tube is initiated. The anode of the left-hand section of tube 316 is coupled to the grid or control element of tube 317 through the direct coupling network 334. Before the left-hand section of tube 316 was brought into conduction the grid of tube 317 draws grid current through the resistive element of network 334 and the condenser element is charged to a voltage approximating the plate supply voltage for tube 316. Tube 317 thus conducts heavily and its anode is at a low positive potential. When current starts to flow through the left-hand section of tube 316 its anode potential falls abruptly and this change is communicated to the grid of tube 317, via the condenser of network 334, quickly interrupting its conduction and allowing its anode potential to become more positive. The positive voltage swing is applied to the control grid of tube 318 through the coupling condenser 335. Tube 318 operates as a cathode-follower and causes a positive voltage to appear across the output resistor 323 which supplies a pulse of positive polarity to the output conductor 328 while maintaining an impedance of low magnitude between conductor 328 and ground.

Conductor 328 extends to two of the resonant circuits which are shock-excited. Consequently, the oscillating current from these circuits passes through conductor 328 and will reverse in polarity. Tube 318 is a unilateral conducting device so it would cut off one portion or polarity of the oscillating currents. To avoid this difficulty a second output tube 320 is provided. The anode of tube 320 is connected to the cathode of tube 318 and the control element of this tube is connected through a coupling network comprising resistor 322 and condenser 321 to the anode of tube 317. The control element of tube 320 is also connected through a diode 319 to a source of negative voltage. The diode 319 prevents the grid of tube 320 from rising above a predetermined negative voltage which voltage nevertheless is sufficient with respect to the cathode of tube 320 to cause a large current to flow in the anode-cathode circuit of tube 320. When tube 317 is cut off, as it is for a portion of each cycle of the frequency source 110, condenser 321 attains its maximum charge. When tube 317 is heavily conducting, as it is for the remaining portion of each cycle, condenser 321 retains most of its charge, losing only a little by discharge through resistance 322, and hence the grid of tube 320 is carried far negative with respect to its cathode, thus interrupting its anode current. As a result, tube 320 has a large current flowing in its anode-cathode circuit at the same time that tube 318 is delivering its positive pulse as a cathode follower. The current flowing through the anode-cathode path of tube 320 also flows through the anode path of tube 318 with the result that the anode-cathode current of tube 318 exceeds the peak oscillating currents from the resonant circuits which also flow to the cathode of tube 318 over conductor 328 as will be described hereinafter. In addition, by providing tube 320 to supply additional anode-cathode current for tube 318, the cathode resistor 323 may be made to have a sufficiently high value to provide substantially critical damping for the resonant circuits when tubes 318 and 320 are cut off at the end of the pulse from tube 317. In this way the energy remaining in the resonant circuits at this time is rapidly dissipated.

The condenser 333 and the variable condenser 327 determine the time interval during which the current flows through the right-hand section of tube 316. The condenser 327 is adjusted so that current flows through the left-hand section of tube 316 for a time interval equal to the time interval during which it is desired to transmit signaling currents, i. e., five milliseconds in the exemplary embodiment set forth herein. At the end of this time interval the charge on condensers 333 and 327 will have changed sufficiently to permit current to again flow through the right-hand section of tube 316 and interrupt the flow of current through the left-hand section. As a result, the anode of tube 317 again becomes less positive or more negative and applies negative-going voltages to the control grids of tubes 318 and 320. This negative voltage is of sufficient magnitude to substantially interrupt the flow of current through both these tubes with the result that the impedance between the conductor 328 and ground is controlled by resistor 323 which resistor has a value or magnitude designed to damp out the alternating currents flowing in the resonant circuits at this time. In an exemplary embodiment this resistor has a value which is substantially equal to the critical damping resistance of these resonant circuits. Consequently, at the end of the pulse determined by the single cycle multivibrator tube 316 the oscillating currents flowing in the resonant circuits is interrupted. In an exemplary embodiment of this invention the condenser 327 is adjusted so that the oscillating current flows for approximately five milliseconds which is an integral number of half cycles of each and all of the resonant circuits which may be shock-excited.

Conductor 328 extends from the cathode of tube 318 to the switch arms 109 and 119 shown in Fig. 4. When these switch arms are positioned as shown in Fig. 4 the circuit of conductor 328 then extends over conductor 410 to the armatures of relays 531 through 540, inclusive. Then, as each of these relays becomes operated on successive cycles from oscillator 110, the circuit of conductor 328 extends through the corresponding operated relay contacts 531 through 540 to the pairs of switch arms 120, 121; 122, 123; 124, 125 etc., there being provided a pair of these switch arms for each of the digits it is desired to control. The switch arms 120, 121, for example, are positioned in accordance with the value of the digit to be represented by pulses transmitted during the first digit interval and the switch arms 122, 123 positioned in accordance with the value or identity of the digit or numeral to be represented by the second set of pulses. The succeeding switch arms are similarly positioned in accordance with the identity or value of the numeral to be represented by the corresponding pulses to be transmitted.

Thus, assume that the switch arms 120 and 121 are positioned on the No. 4 contacts, then in response to a first cycle of alternating current from oscillator 110 after power has been applied to the system or after switch arm 118 is positioned as shown in Fig. 4 to supply power to the digit's stepper circuit shown in Fig. 5, conduction through the right-hand section of tube 313 is interrupted and a discharge is initiated through the left-hand section of this tube. As a result, a positive pulse is applied over conductor 329 to initiate a discharge through tube 511 causing tube 521 to conduct current and operate relay 531. At the end of the time interval for which the single cycle multivibrator 313 is adjusted, during which time interval relay 531 operates, a discharge is initiated through the right-hand section of tube 313 as described hereinbefore. As a result, a positive pulse is applied to the control element of tube 315 which in turn applies a negative pulse to the left-hand anode and right-hand grid of tube 316, thus interrupting the flow of current through the right-hand section and initiating the flow of current through the left-hand section of tube 316. As a result, a positive voltage is applied to the control grids of tubes 318 and 320 with the result that a positive voltage is abruptly applied to the cathode of tube 318 which voltage has a wave form of a step and is sufficiently abrupt to shock-excite the number "zero" and number "four" resonant circuits, which circuits include the condenser 170 and inductance 150 and condenser 174 and inductance 154, respectively. At this time, the impedance of the cathode of tube 318 to ground is relatively quite low and is maintained at a low value. Since the current flowing through this tube exceeds the peak oscillating current from the oscillating circuits, the circuit path for the oscillating currents may be traced from the cathode of tube 318 over conductor 328, switch arm 109, conductor 410, armature and operated contacts of relay 531, switch arms 120 and 121 and then through the number "zero" and number "four" resonant circuits to ground through the resistors 159 and 169. During the time tube 318 and tube 320 are conducting, the magnitude of the voltage upon the cathode of tube 318 slowly decreases due to the charging of the coupling condenser 335. This small rate-of-change in voltage, however, is insufficient to materially affect or alter the operation of the resonant circuits. The voltage drop of the alternating currents induced in the resonant circuits at this time flowing through resistor 169 is applied to the primary winding of the coupling or transmitting transformer 114. The resistors 159 and 179 are provided for decoupling purposes so that the variations in the impedance of the line 130 do not materially affect or alter the frequency or other operation of the resonant circuits in generating the alternating currents. At the end of the time interval for which condensers 327 and 333 are adjusted in combination with the other circuit parameters of the single cycle multivibrator comprising tube 316, a more negative voltage is applied to the control grids of tubes 318 and 320 with the result that the impedance of the cathode circuit of the tube 318 and the anode circuit of the tube 320 becomes relatively high and the impedance of lead 328 to ground is substantially equal to the impedance of resistor 323. This resistor is selected to have a value substantially equal to the critical damping resistance of the resonant circuits with the result that the electrical energy in these circuits is rapidly dissipated in the resistor 323 without further substantial oscillations.

In the exemplary embodiment of this invention set forth herein the condensers 327 and 333 are adjusted so that the current flowing through tubes 318 and 320 is interrupted at the end of an integral number of half cycles of the oscillating current. In other words, the positive pulse applied to conductor 328 is terminated at the precise instant when the current flowing through the resonant circuits is zero. Consequently, the only energy stored in these circuits at this time will be the charge upon the respective condensers which is dissipated in the manner described above.

As the switch arms 118 and 119 and 109 are moved to the position opposite to that shown in Fig. 4, then the circuit of conductor 328 extends through the switch arms 107 and 117 instead of to the armature of relays 531 through 540, inclusive. As a result, the switch arms 107 and 117 select a pair of resonant circuits depending upon the setting of these brush arms and cause the same pair of alternating currents to be transmitted during each pulse interval.

If the switches 117 and 107 are set in the off position, under these circumstances, then the circuit of the conductor 328 extends to the plug 315 which is inserted in one of the jacks 103, 104, 105, 116 or 108. As a result, only a single frequency alternating current is generated during each digit interval which frequency is determined by the particular one of the jacks in which plug 115 is inserted.

The signals generated by the signal generating circuit represented in Fig. 1 and shown in detail in Figs. 3, 4 and 5 may be transmitted over any suitable signaling path which path is represented in Figs. 1, 2, 3 and 6 by conductors 130. This signaling path may be of any suitable length and extend to a distant receiving station which, in the usual case, will be a central switching station. The signaling path represented by conductors 130 may comprise a voice frequency path, a channel of a carrier current signaling system, a channel of a radio signaling or communication system including ultra-high frequency radio systems wherein radio waves possess properties analogous to light waves. The transmission path represented by conductors 130 may also comprise any combination of such paths. In addition, the path 130 also includes terminating, interconnecting, amplifying, regulating, etc. equipment employed in such paths and systems. Inasmuch as these various communication paths and their related equipment all operate in their usual and well understood manner in cooperation with the other elements of applicants' improved signaling arrangement, details of these paths have not been shown or described herein.

The conductors 130 from Figs. 1 and 3 extend to plugs 210 and 211 as shown in Figs. 2 and 6. In accordance with the showing in the drawing, the plugs 210 and 211 are normally inserted in corresponding jacks 212 and 213. The plug and jack arrangements comprising plugs 210 and 211 and jacks 212 and 213 represent any suitable type of switching equipment which may be employed to extend signaling conductors 130 from the subscriber's station or from another central office or switching station to the receiving equipment represented in Fig. 2 and shown in detail in Figs. 6, 7, 8, 9 and 10. The switching equipment represented by plugs 210 and 211 and jacks 212 and 213 may comprise manual switching equipment including one or more manual switchboards. This equipment may also comprise automatic switching equipment which automatically extends the signaling path represented by conductors 130 to the receiving equipment which receiving equipment will normally be located in a sender or register in an automatic switching system.

When a line is first extended from conductors 130 to the receiving equipment shown in Figs. 2 and 6, it will be terminated in the terminating resistors 214 because relay 216 will normally be non-operated at this time.

Upon seizure of the receiving circuit, which may comprise a portion of a sender or register circuit in an automatic switching system, contacts 215 are closed. Contacts 215 may be relay contacts and may be closed by the automatic switching equipment in any suitable manner or they may be manually closed by a key or by a relay which in turn is manually controlled.

The closure of the contacts 215 completes a circuit for the operation of relay 216 which circuit extends from battery through the lower right-hand break contacts of key 217, the break contacts of relay 218, both windings of relay 216 to ground through the operated contacts 215.

Relay 216 in operating transfers the signaling circuit over conductors 130 from terminating resistance 214 to the input transformer 617 of the receiving amplifier comprising tubes 618, 619 and 620. The operation of relay 216 may be employed to perform other switching functions when desired.

Tube 618 comprises a voltage amplifier tube arranged to amplify the received signals received over conductors 130 and transmitted through the receiving transformer 617. The output of tube 618 is coupled to tube 619. Tube 619 is in turn connected to tube 620 which is operated as a cathode-follower tube to provide a low output impedance. In addition, a feedback path comprising condenser 621 and a resistor 622 from the cathode of tube 620 to the input or grid circuit of tube 619 is provided to further reduce the output impedance of the tube 620. The cathode or output circuit 623 from tube 620 is connected to the receiving resonant circuits shown in Fig. 7. The low output impedance of the cathode-follower type tube circuit 623 is further greatly reduced by the feedback circuits and is sufficiently low so that this impedance does not provide appreciable coupling between the resonant circuits of Fig. 7 or otherwise materially affect the alternating currents flowing through the resonant circuits of Fig. 7.

The frequency characteristics of the amplifier comprising tubes 618, 619 and 620 must be sufficient to pass all of the signaling frequencies, namely, 500, 700, 900, 1100 and 1300 cycles in an exemplary embodiment of this invention, without substantial amplitude or phase distortion.

Thus, the output conductor 623, under normal operations, has simultaneously applied to it, two received and amplified alternating currents or two alternating-current voltages having frequencies of two of the signaling frequencies. The output conductor 623 extends through the coupling condenser 760 to the primary windings of transformer 761. The secondary windings of the transformer extend to respective grids of tube 763. The connections from the secondary to the transformer 761 to the left-hand and right-hand grids of tube 763 are arranged so that opposite phases of the received alternating currents are applied to the respective grids of tube 763.

Owing to deliberate or accidental circuit turnovers in the transmission medium or equipment connecting receiver to transmitter, it is impossible to be sure that the polarity of the first half cycle of the alternating currents applied to the conductor 623 will be always positive or always negative. Since it is desirable to initiate operation of circuits controlled by tube 763 as soon after the reception of a signaling pulse as possible, the input pulses are applied to the two grids of this tube in phase opposition so that one or the other of the sections of this tube will conduct current on the first half cycle of the received alternating-current pulses and apply a negative pulse to the circuits of tube 764 as described hereinafter.

Before the application of signals to tube 763, substantially no grid bias is applied to the grids of this tube. However, upon the application of signals to this tube a voltage rapidly builds up across the self-biasing condenser and resistor combination 762 to approximately the peak amplitude of the applied signal voltages. Thus, the bias voltage on the grids of this tube is controlled by the amplitude of the applied signal and is automatically adjusted in accordance with the amplitudes of these applied signals.

Inasmuch as both sections of tube 763 have a high amplification factor and due to the low plate voltage applied to this tube and the magnitude of the plate resistor, the tube plate current tends to cut off at a relatively low grid voltage of approximately minus one volt. By thus arranging the grid circuits of tube 763, after the self-biasing voltage is built up to approximately the peak voltage of the received signals as applied to the grids of tube 763 due to the constants of the self-biasing network 762 and the other parameters of the tube, the tube thereafter is relatively insensitive for a short time to noise voltages or currents which produce voltages which are less than the applied signal voltages. Also, only the peaks of the applied alternating-current voltage pulses cause current to flow in the output circuits of this tube. By thus choosing the parameters of the circuits of tube 763, this tube combines the features of a full wave rectification or response to the first half cycle of the applied alternating-current pulses, a wide range of tolerance to input signal amplitudes and discrimination against interference or noise so long as the interference or noise voltages as applied to the grids of tube 763 are below the magnitude of the signal voltages applied to these grids.

Both sections of tube 764 are connected in a single cycle multivibrator circuit with the left-hand section normally conducting current. The circuits of this tube are arranged so that upon the application of a negative pulse from the plates of tube 763, which are connected in parallel, through the coupling condenser 767 to the right-hand anode of tube 764 and then through the coupling condenser 768 to the left-hand grid of tube 767, the current normally flowing through the left-hand section of this tube is interrupted and a flow of current through the right-hand section is initiated. Thereafter, current continues to flow through the right-hand section of tube 764 for a time interval determined by the values of condenser 768 and the other parameters of this circuit. In an exemplary embodiment of this invention the time constants of these circuits is selected so that current continues to flow through the right-hand section of tube 764 for approximately seven milliseconds. The seven milliseconds have been selected as the time during which current flows through the right-hand section of tube 764 because this interval allows two milliseconds in addition to the five milliseconds during which the alternating-current components of the signaling pulses are transmitted. The two-millisecond interval in addition to the five milliseconds permits delay distortion of approximately two milliseconds. In other words, the termination of the received signaling pulses of different frequencies may vary by approximately two milliseconds without affecting the operation of the system. Of course, if more delay distortion is encountered the seven-millisecond interval may be extended to a longer interval but if this interval is extended too long the speed of transmission will be slower. At the end of this time interval current through the left-hand section is initiated and the flow of current through the right-hand section is interrupted due to the fact that the voltage across condenser 768 reaches a value which causes current to start to flow through the left-hand section of tube 764. In other words, each time a discharge is initiated through the right-hand section of tube 764, current continues to flow for a period of time somewhat in excess of the significant five-millisecond interval but less than the period of ten milliseconds allotted per digit or pulse interval.

Once tube 764 has had a discharge through its left-hand section interrupted and the discharge through its right-hand section initiated by a negative pulse from tube 763, further negative pulses from the anode of tube 763 are ineffective with respect to this multivibrator until it restores to its initial condition. During the time a discharge current is flowing through the right-hand section of this tube, termination of an alternating-current pulse received on conductors 130 will cause the current flowing through both sections of tube 763 to be interrupted. As a result, a positive pulse is applied through the coupling condenser 767 to the circuits of tube 764. However, the magnitude of this pulse is prevented from rising to a high value due to the high anode resistance 769 common to the two sections of tube 763. The value of this resistor is sufficiently high so that the positive pulse applied through the coupling condenser 767 to the circuits of tube 764 is usually insufficient to interfere with or affect the state of conduction between the two sections of tube 764.

As described hereinbefore the left-hand section of tube 764 is normally conducting. Upon the arrival of an alternating-current pulse, the discharge current flowing through the left-hand section of tube 764 is interrupted with the result that the voltage of its anode abruptly rises to substantially the anode supply voltage, thus applying a positive voltage through coupling networks to the right-hand grid of tube 764 and also to the lower control grid of tube 765. The upper or second grid of tube 765 is connected to the coupling network 774 and resistor 775 which elements provide a voltage divider from the anode of the right-hand section of tube 772. As will be described hereinafter the right-hand section of tube 772 is non-conducting at this time so that the proper positive bias voltage is applied to the second or upper grid of tube 765 to cause a discharge to be initiated in this tube upon the application of a positive voltage from the left-hand anode of tube 764.

Tube 765 is a gas conduction tube and is provided with a discharge interrupting circuit comprising condenser 766 connected between its anode and ground and resistors 770 and 771 connected between its anode and an anode supply voltage. Upon the operation of relay 216 as described above, ground from the lower break contacts of this relay is removed from between the two anode resistors 770 and 771 with the result that the condenser 766 starts to charge through the resistors 770 and 771. Each time a discharge is initiated through tube 765 due to a positive pulse applied from tube 764 as described above, the charge on condenser 766 is dissipated through tube 765 with the result that condenser 766 becomes discharged and the discharge current flowing through tube 765 interrupted whereupon the condenser 766 again starts to charge through resistors 770 and 771. The magnitude of these resistors is such that sufficient voltage is applied to the anode of tube 765, due to the charge on condenser 766, before the end of a pulse interval so that a discharge may be initiated through tube 765 at the beginning of each of the received alternating-current pulses in the manner described above.

The cathode of tube 765 is coupled to the cathode of both sections of tube 772 through coupling condenser 776. Both sections of tube 772 are connected in a single cycle multivibrator circuit in which the left-hand section is normally conducting current. Upon the application of a positive pulse from the cathode of tube 765 due to the initiation of a discharge through this tube, the cathodes of tube 772 become more positive and in effect apply a negative pulse to the left-hand section of this tube, thus interrupting the discharge through the left-hand section and initiating a discharge through the right-hand section. The discharge current flowing through the right-hand section of tube 772 causes the voltage of its anode to fall to relatively low value with the result that the voltage applied to the upper or second grid of tube 765 also falls to a low value which value prevents further discharges through the 765 should additional pulses be applied to its lower or first grid from tube 764. The time constants of the single cycle multivibrator 772 are selected so that at the end of approximately seven or eight milliseconds a discharge is again initiated through the left-hand section of this tube and the discharge through the right-hand section interrupted with the result that the anode of the right-hand section again rises to substanitally anode supply voltage and a sufficiently positive bias is applied to the upper or second grid of tube 765 to permit a discharge to be initiated through this tube upon the application of the succeeding positive pulse to its lower or first grid from tube 764. Thus, after a discharge is once initiated through tube 765 it is very difficult if not impossible to initiate another discharge through this tube until near the beginning of the next succeeding pulse interval.

The anode of tube 765 is also connected to the left-hand grid of tube 773. The two sections of tube 773 are connected in a differential amplifier circuit in which the right-hand section is normally conducting current. The grid of the right-hand section has a positive voltage applied to it by means of the voltage divider 777. So long as the voltage applied to the grid of the left-hand section of this tube is less positive than the voltage applied to the right-hand grid, the right-hand section continues to conduct current and the left-hand section conducts substantially no current. The voltage applied to the grid of the left-hand section of tube 773 from the anode of tube 765 during a single pulse interval does not rise sufficiently high to cause current to flow through the left-hand section of tube 773 and interrupt the current flowing through the right-hand section of tube 773. As described above, so long as pulses are received during each pulse interval the condenser 766 is rapidly discharged at the end (or beginning) of each of these pulse intervals. Consequently, neither the plate of tube 765 nor the grid of the left-hand section of tube 773 rises to a sufficiently high voltage to cause current to flow through the left-hand section of tube 773.

However, during a blank interval between complete subscribers' designations no pulses are sent out, and hence none are received, for two pulse intervals. Consequently, the voltage on condenser 766 and thus the voltage of the anode of tube 765 and the grid of the left-hand section of tube 773 rises to a much higher value. Near the end of this second pulse interval, during which no alternating-current pulses are received over line 130, the voltage of the grid of the left-hand section of tube 773 rises to a value which substantially equals or exceeds the voltage of the right-hand grid with the result that a discharge current is initiated through the left-hand section of tube 773 which discharge current causes the cathode of both sections of this tube to become more positive. The current in the left-hand section also causes the anode of that section to become less positive or more negative and this negative pulse is coupled to the grid of the right-hand section by means of capacitor 778. The combined action of the common cathodes becoming more positive and the right-hand grid becoming more negative serves to quickly interrupt the current flowing through the right-hand section of this tube. As a result, the anode of the right-hand section of tube 773 rises to substantially the anode supply voltage and applies a positive pulse to the control grids of tubes 1051 through 1060.

The cathode of tube 765 in addition to being coupled to the cathodes of both sections of tube 772 as described above, is also coupled to the cathodes of both sections of the tube 871. The sections of tube 871 are connected in a single cycle multivibrator circuit in which the left-hand section is normally conducting current. The application of the positive pulse to the cathodes of both sections of this tube, in response to discharges through tube 765 in effect, applies a negative pulse to the left-hand section of this tube, with the result that the discharge current flowing through the left-hand section is interrupted and a current discharge initiated through the right-hand section. Thereafter, a current continues to flow through the right-hand section for the time interval for which this circuit is adjusted.

The interruption of the current flowing through the left-hand section of tube 871 causes the voltage of the anode of this section to rise to substantially the anode supply voltage, with the result that a positive pulse is applied through the coupling condenser 875, to the circuits of tube 872 and a positive voltage is also applied through the coupling condenser 876 to the right-hand grid of tube 874.

The circuits of tube 872 are also arranged in a single cycle multivibrator circuit in which the left-hand section is normally conducting current, and the right-hand section of this tube is not conducting current, consequently the application of a positive voltage through the coupling condenser 875 to the anode of the right-hand section and then through the coupling condenser 879 to the grid of the left-hand section does not alter or materially affect the flow of the currents within either section of this tube.

The circuits of the sections of tube 874 comprise a double stability circuit frequently called a "flip-flop" circuit in which either section, once current is initiated through it, continues to conduct current for an indefinite interval of time until the current flowing through this section is interrupted due either to an applied voltage or signaling condition or due to the initiation of the flow of current through the other section of this tube. Normally, the right-hand section of tube 874 will be conducting at this time with the result that the application of the positive voltage or pulse to its grid through the coupling condenser 876 does not cause the currents flowing through the two sections of tube 874 to reverse at this time. If for any reason current should be flowing through the left-hand section of tube 874 instead of through the right-hand section at the time of the application of the positive pulse through the coupling condenser 876, then the application of this positive pulse initiates the flow of current through the right-hand section of this tube and interrupts the flow of current through the left-hand section.

In the exemplary embodiment of this invention described herein, the single cycle multivibrator circuit of tube 871 is arranged so that once a discharge is initiated through the right-hand section of this tube, the discharge continues to flow for a period of time equal to approximately 6.5 milliseconds. At the end of the 6.5 millisecond interval of time, the voltage conditions on condenser 880 cause the grid of the left-hand section of this tube to reach a voltage such that the flow of current through the left-hand section is again initiated, and the flow of current through the right-hand section interrupted. The initiation of the flow of current through the left-hand section of tube 871 causes the voltage of its anode to fall to a relatively low voltage and as a result, a negative voltage or pulse is applied through the coupling condenser 875 to the anode of the right-hand section of tube 872, and through the coupling condenser 879 to the grid of the left-hand section of tube 872. Consequently, the flow of current through the left-hand section of this tube is interrupted, and a discharge through the right-hand section initiated. Thereafter, current continues to flow through the right-hand section for a period of time determined by the condensers, resistors, and other parameters of this tube and circuit which, in the exemplary embodiment of the invention described herein, is approximately 2.2 milliseconds.

The interruption of the flow of current through the left-hand section of tube 872 causes its anode to rise to approximately the anode of supply voltage, and in turn apply a positive voltage pulse through the coupling condenser 878 to the anode of the right-hand section of tube 873, and then through the coupling condenser 881 to the grid of the left-hand section of tube 873. Both sections of tube 873 are connected in a single cycle multivibrator circuit in which the left-hand section is normally conducting current. Consequently, the application of a positive pulse through the coupling condenser 878 at this time does not alter or materially affect the flow of current within the sections of tube 873.

Restoration of a discharge through the left-hand section of tube 871, as described above, applies negative voltage through the coupling condenser 876 to the grid of the right-hand section of tube 874, with the result that the current flowing through the right-hand section of tube 874 is interrupted and the flow of current through the left-hand section of this tube initiated.

At the end of the approximately 2.2 millisecond time interval of the timing multivibrator circuits of tube 872, a discharge of current is again initiated through the left-hand section of tube 872, and the discharge of current through the right-hand section interrupted. As a result, the voltage of the anode of the left-hand section falls to a relatively low value and applies a negative voltage through the coupling condenser 878 to the anode of the right-hand section, and through the coupling condenser 881 to the grid of the left-hand section of the "look" multivibrator circuits of tube 873. As a result, the current flowing through the left-hand section of this tube is interrupted and the flow of current through the right-hand section initiated. The time constants of the circuits of the multivibrator comprising tube 873 are arranged so that current continues to flow through the right-hand section of this tube for approximately one millisecond. At the end of this time interval, the flow of current through the left-hand section is again initiated and the current flowing through the right-hand section interrupted. As a result, the voltage and the anode of the left-hand section falls to a relatively low value and applies a negative voltage pulse through the coupling condenser 877, to the grid of the left-hand section of tube 874, thus interrupting the current flowing through the left-hand section of this tube, and causing a current to flow through the right-hand section.

Thus in response to each of the received alternating-current pulses from line 130 (two alternating currents of different frequencies are ordinarily present simultaneously in a received pulse), a discharge is initiated through tube 765, which discharge actuates the single cycle multivibrator circuit of tube 871. Approximately 6.5 milliseconds later the circuits of the multivibrator circuit 872 are actuated and the current flowing through the sections of tube 874 reversed. At the end of the 2.2-millisecond time interval of the single cycle multivibrator circuits of tube 872, the current flowing through these sections of the multivibrator circuit of tube 873 are also reversed and at the end of a further millisecond time interval the current flowing through the sections of both tube 873 and tube 874 are again reversed and restored in their initial condition.

The voltage of the left-hand anode of tube 874 is repeated by the left-hand section of tube 860 which operates as a cathode follower tube and applies a corresponding voltage to the grids of the left-hand sections of tubes 840, 847, etc. to control these tubes as will be described hereinafter.

The voltage of the anode of the left-hand section of tube 873 is repeated by the right-hand section of tube 860. This section also operates as a cathode follower. The voltage of the anode of the right-hand section of tube 873 is repeated by tube 861 after the wave front of the pulse is made somewhat less steep by resistance 885 and capacitor 886, which tube also operates as a cathode follower tube.

As described above, the output of the cathode follower tube 620 of the receiving amplifier is applied to each of the resonant circuits shown in the upper half of Fig. 7, in addition to being applied to the grids of both sections of tube 763. The circuits through the resonant circuits may be traced from the cathode of tube 620 and over conductor 623 to the resonant circuit comprising inductor 710, resistor 730 and condenser 720 to ground. A circuit likewise may be traced from the cathode of tube 620 over conductor 623 through the resonant circuit comprising inductor 711, resistor 731 and condensers 721 and 721' to ground. Similar circuits may be also traced from the cathode of tube 620 through the other resonant circuits comprising inductors 712, 714 and 717. The application of alternating-current pulses received from line 130 and applied to the conductor 623 in the manner described above causes alternating currents to flow in each of the resonant circuits.

As described above, the applied signaling pulses have alternating current components having frequencies which are the same as the frequencies of two of the resonant circuits. Alternating currents of these frequencies continue to flow in said corresponding resonant circuits for an interval of time appreciably longer than the time of application of the alternating-current pulse thereto over conductor 623.

However, the applied alternating-current signal pulse does not contain any frequency components having the same frequency as the frequency of the other three resonant circuits. Nevertheless, alternating currents start to flow in such other resonant circuits and reach a maximum value and then fall to substantially zero. The time required for the alternating currents in the other resonant circuits to fall to zero is the reciprocal of the frequency difference between the alternating current applied to the respective resonant circuits and the frequencies to which said circuits are adjusted or tuned. Thus when the frequency difference is 200 cycles alternating, the current falls to zero in approximately five milliseconds. Since 200 cycles is the minimum frequency separation in the exemplary embodiment shown in detail herein, the maximum time during all signaling conditions for the currents in the other three resonant circuits for the currents to fall to zero will be a maximum of five milliseconds. If the frequency separation is greater as for example, 400 cycles, then the first time at which the current in the corresponding resonant circuit falls to zero will be 2½ milliseconds after the start of the pulse. However, current will also fall to zero in this circuit at approximately five milliseconds after the start of the pulse. If the frequency separation is still greater the alternating current falls to zero more rapidly in the corresponding resonant circuit and falls to zero more often during the five milliseconds. However, in each case the current is also zero at approximately the end of the five-millisecond interval. In other words, the current or currents in the other resonant circuits rises to maxima of decreasing amplitude and then falls to zero at the times which are equal to the reciprocal of the frequency separation between the frequency component of the received signal and the frequencies of which the networks are adjusted and at times which are equal to integral multiples of this interval. Consequently, under the assumed signal frequencies the alternating current in all of the other three resonant circuits is zero at the end of approximately five milliseconds.

The foregoing times assume no transmission delay or delay distortion. The time of transmission of the signals will not effect the length of the intervals described above but merely cause them to start at a later time at the receiving station or end of the line. However, in the case of delay distortion wherein the different frequency components require different times for transmission the different frequencies will not arrive at the receiving terminal at the same time. To permit appreciable delay distortion the receiving circuits are arranged so that they will wait an additional two milliseconds or a total of seven milliseconds from the start of the first received alternating-current pulse for the termination of the last of the alternating-current components before the detecting and integrating circuits are activated to test and respond to the currents flowing in the receiving resonant circuits. In this manner, the delay distortion up to approximately two milliseconds may be tolerated by the receiving equipment without causing false or improper operation of the circuits described herein.

In accordance with this invention the transmitting and receiving circuits are disassociated at the end of this time, since the pulse is terminated by suppressing oscillations in the transmitting circuits at this time. As a result, substantially no current flows thereafter in the receiving resonant circuits tuned to frequencies other than those frequencies comprising the alternating-current signaling pulses. However, current continues to flow in those receiving resonant circuits tuned to frequencies corresponding to the frequency components of any applied signaling pulse or pulses.

The voltage drop across the condenser 720 of the first resonant circuit is applied to the grid of cathode follower tube 704. Condensers 721 and 721' comprise a voltage divider in the second resonant circuit and apply a voltage to the grid of tube 741, which is substantially the same magnitude as the voltage applied to the grid of tube 740 when the two circuits are excited to the same extent by their appropriate frequencies. In a similar manner, voltages are applied to the grids of tubes 742, 744 and 747 in response to alternating currents flowing in the corresponding resonant circuits. The output from the cathode follower tubes 740, 741, etc. are connected to the grids of amplifier tubes 810, 817, etc. Thus the cathode of tube 740 is connected through the coupling circuit comprising a condenser 818 and resistor 819 to the control grid of tube 810. The cathodes of the other cathode follower tubes 841, 842, etc. are likewise connected to additional tubes, of which tube 817 is the only other one shown in Fig. 8. Other tubes are nevertheless provided and connected in circuits similar to the circuits shown for the tubes 810 and 817.

The coupling condenser 818 and resistor 819 are employed to obtain negative bias voltage for the detector tube 810. The voltage across the condenser 818 rises to substantially the peak voltage of the applied alternating current from the first resonant circuit. Assume for purpose of illustration that the alternating current voltage received from line 130 contains a frequency to which the first resonant circuit was adjusted, but does not contain a frequency for which the last resonant circuit is tuned. Under these assumed circumstances, current continues to flow in the first resonant circuit after the application of the signaling voltage pulse, while a similar current does not continue to flow in the last resonant circuit. In response to the application of such received pulses from line 130, a negative voltage is developed across both the coupling condensers 818 and 828 and applied to the control grid of the corresponding detector tubes 810 and 817. The voltage developed across the condenser 818 is substantially equal to the voltage applied from the cathode of tube 740 during the application of voltage from the cathode of tube 620. As a result, an amplified signal continues to flow in the plate circuit of tube 810 through transformer 820.

In the case of tube 817, however, the voltage across coupling condenser 828 builds up to substantially the maximum peak voltage of the applied wave from the cathode of tube 747. Thereafter, when the magnitude of the wave form decreases and reaches approximately zero, after approximately five milliseconds the negative bias from the condenser 828 has not correspondingly decreased, with the result that the current in the plate circuit of tube 817 likewise falls to substantially zero.

The output of tube 810 is coupled to the output transformer 820 with full wave rectifier bridge network 830. The positive output terminal of the bridge network is connected to ground and the negative terminal is connected to a resistance network comprising resistors 801 and 802. Resistor 802 is connected between the negative terminal of the bridge and ground while resistor 801 is connected between the negative terminal of the bridge and the lower terminal of condenser 804 and the grid of the left-hand section of tube 840. The left-hand section of tube 840 operates as an integrating device due to the condenser 804 connected between its anode and grid and the resistor 801 connected to its grid. The operation of the tubes as integrating devices in this manner is described in greater detail beginning on page 79 of a book entitled "Electronic Instruments" in the Massachusetts Institute of Technology Radiation Laboratory series, published by the McGraw-Hill Book Company, Inc.

The left-hand section of tube 840, however, is normally prevented from operating as an integrating device due to the operation of the right-hand section of tube 840. The right-hand section of all the tubes 840 through 847, etc. have their cathodes connected together and to the anode of the gas discharge tube 862. The gas discharge tube 862 operates as a voltage regulator tube in combination with resistor 828 and tends to maintain the cathodes of the right-hand sections of tubes 840, 847, etc. at a fixed voltage. The bias on the grids of the left-hand sections of tubes 840, 847, etc. are controlled by means of the voltage dividing resistors 808 together with resistors 801, 802 and 803 for tube 840 and similar resistors for the other tubes 847, etc., so that the anodes of the left-hand sections when no voltage is applied to their grids from the bridge networks such as 830 are substantially the same as the voltage of the cathodes of the right-hand sections of these tubes when the right-hand sections are cut off.

Normally, however, the right-hand sections of tubes 840, 847, etc. have their grids maintained at a relatively high positive voltage so that the anodes of these tubes are maintained at substantially the same voltage as the cathodes of these tubes. As described above, the left-hand section of tube 874 is normally non-conducting so that its anode is at substantially the plate supply voltage. The anode of the left-hand section of tube 874 is connected to the grid of the right-hand section of tube 860 by means of conductor 882. Consequently, the left-hand section of tube 860 which operates as a cathode follower repeats a high positive voltage to the grids of the right-hand sections of tubes 840, 847, etc. and maintains the impedance between the anodes and cathodes of these tubes at a relatively low value so that the anodes of both sections of tubes 840, 847, etc. are maintained at substantially their quiescent or normal voltage or potential condition. The action of the right-hand sections of these tubes tends to maintain the anodes of both sections of these tubes at substantially the same voltage as the cathodes of the right-hand sections of these tubes independent of the application of any voltage to the grids of the left-hand sections from the full wave rectifiers such as the rectifier bridge network 830.

As described hereinbefore, upon the application of each pair of signaling frequencies received from conductors 130 and applied to the output conductor 623, currents are caused to flow in all of the resonant circuits shown in Fig. 7. In addition, the circuits in the lower half of Fig. 7 are actuated as described above and cause the current flowing through the left-hand section of tube 871 to be interrupted and the flow of current through the right-hand section of this tube initiated. The signaling pulses are applied for a time interval of approximately 5 milliseconds in the exemplary embodiment described in detail herein with the result that the alternating current in three of the resonant circuits falls to substantially zero at this time and remains at a very low value or substantially zero until the next pulse is received. The alternating current in the other two resonant circuits which are tuned to the same frequencies as the applied signal pulses continues to flow for an appreciable interval of time of the order of 5 milliseconds or longer.

It is assumed herein for purposes of illustration that alternating current continues to flow in the resonant circuit comprising inductor 710 for an appreciable period of time after the end of the 5-millisecond interval while no such current tends to flow in the resonant circuit comprising inductor 717 after the 5-millisecond signaling interval. Consequently, tube 810 continues to cause pulses of current to flow in its output circuit through transformer 820 which pulses are applied to the full wave rectifier 830 employed to develop a negative voltage at its output terminal which negative voltage is applied to the grid of the left-hand section of the integrating tube 840. In the case of tubes similar to tube 817 no such current continues to flow in its output circuit because the voltage applied to its grid circuit falls below the peak of the previously applied voltage to which the coupling condenser 828 has become charged. Consequently, little or no current is applied to the bridge network 837 and as a result substantially no voltage from this network is applied to the grid of the left-hand section of tube 847.

As described above, approximately 6½ milliseconds after the beginning of the received pulse a flow of current is again initiated through the left-hand section of tube 871. Consequently, its anode falls to a relatively low value and applies a negative pulse to the grid of the right-hand section of tube 874. Consequently, the flow of current to the right-hand section of this tube is interrupted and a flow of current through the left-hand section initiated. Consequently, the voltage of the left-hand section of this tube falls to a relatively low value which voltage is repeated by the left-hand section of the cathode-follower circuit of tube 860 and applied to the grids of the right-hand sections of tubes 840, 847, etc. During the time interval during which relatively low voltage is applied to the grids of the right-hand sections, the right-hand sections of these tubes are cut off so that the left-hand sections are permitted to operate as integrating devices. Inasmuch as substantially no voltage is developed at the output terminal of bridge 837 due to the fact that the bias on tube 817 exceeds the signal amplitude applied to this tube from the last resonant circuit, the voltage of the anode of both sections of tube 847 remains at substantially its previously adjusted value near the voltage of the cathode of the right-hand sections of these tubes.

In the case of tube 840 and its related circuit, under assumed conditions that alternating current continues to flow in the first resonant circuit after the termination of the signaling pulse, a voltage derived from this resonant circuit across condenser 720 will be repeated by tube 810 and cause the application of a negative voltage through the resistor 801 to the grid of tube 840 and to the integrating condenser 804. Consequently, condenser 804 continues to charge so long as this voltage is present and causes the voltage of the anode of both sections of tube 840 to rise.

Thus, for the two detector circuits which have resonant circuits tuned to the two incoming frequencies, the anodes of the corresponding integrating tubes rise to a more positive voltage so long as the right-hand sections of tubes 840, 847, etc. remain substantially cut off. In case of the other three detector circuits wherein it is not desired that these detector circuits respond to the received pulses because the received pulses have frequencies other than those to which the resonant circuits are tuned, substantially no voltage is applied from the corresponding bridge networks to the control element of the left-hand sections of tubes 840, 847, etc.

After an additional time interval of approximately 2.2 milliseconds as described above, the flow of current through the left-hand sections of tube 873 is interrupted and the flow of current through the right-hand sections of this tube initiated. The voltage change of the anode of the left-hand section of tube 873 is repeated by the right-hand section of tube 860 which operates as a cathode-follower and applies corresponding change in voltage through the coupling networks 818, 819, etc. to the grids of the left-hand sections of tubes 850, 857, etc.

Tubes 850, 857, etc. have both sections connected in a differential amplifier circuit in which the right-hand sections are normally conducting current. Each tube has its right-hand grid connected through a resistance to ground. To switch conduction, therefore, it is necessary for the left-hand grid to be carried to a potential which is positive, or at least not far negative with respect to ground. The potential at the left-hand grids of tubes 850, 857, etc. is made up from contributions from three sources: the anode voltage of the corresponding integrator tubes, 840, 847, etc. combined with a negative potential from voltage source 807 in potentiometers 816, 817, etc. and a positive pulse voltage applied through coupling elements 818, 819, etc. The anode voltage from an integrator tube which has not received an input voltage from the corresponding rectifier bridge will be relatively low and the voltage at the slider of potentiometer 817, for example will be considerably negative with respect to ground. Consequently upon the application of a positive pulse through the coupling network 819 due to the operation of the "look" multivibrator 873 as described above, the voltage of the grid of the left-hand section of tube 857 does not rise to a sufficiently high voltage to initiate the flow of current through the left-hand section of tube 857. However, since voltage from rectifier bridge 830 has been applied to the grid of the left-hand section of integrator tube 840 prior to the instant of the "look" pulse, the voltage of the grid of the left-hand section of tube 850 has risen from its considerable negative value to a less negative or more positive value and the addition of the positive "look" pulse through coupling elements 818 suffices to initiate the flow of current through this section and interrupt or reduce the flow of current to the right-hand section with the result that a positive pulse is applied to the output conductor connected to the right-hand anode of tube 850. Capacitor 821 makes the transition more rapid.

The right-hand anodes of tubes 850, 857, etc. are coupled to the grids of the respective sections of tubes 901, 911 and 921. Tubes 901, 911 and 921 operate as cathode-followers so that the operation of the differential amplifier tubes 850, 857, etc. is not affected by the impedance of the load circuits connected to these tubes. The cathode of each section of the cathode-followers 901, 911 and 921 is connected to a summing network of resistors which network is connected to the left-hand grids of tubes 902 and 903.

Tubes 902 and 903 are connected as differential amplifiers wherein the right-hand sections are normally conducting current while the left-hand sections of these tubes are not conducting current. The right-hand grid of tube 902 is biased so that the potential developed by the summing network and applied to the grid of the left-hand section of this tube when positive voltages or pulses are repeated by two sections of the cathode-follower tubes 901, 911 and 921, is sufficiently positive to initiate the flow of current through the left-hand section of tube 902 and the current flowing through the right-hand section of this tube is interrupted. Consequently, the anode of the right-hand section rises to substantially the anode battery supply voltage. This voltage is applied to a summing network comprising resistors 912 and 913.

The bias voltage applied to the right-hand grid of tube 903 is higher than the bias voltage applied to the right-hand grid of tube 902 so that positive pulses must be applied to the control grids of at least three sections of the cathode-followers 901, 911 and 921 to initiate the flow of current through the left-hand section of tube 903 and interrupt the flow of currents through the right-hand section of this tube. Thus, due to the summing action of the resistors 912 and 913 a pulse is applied to the control grid of tube 904 if and only if two pulses of alternating currents of two of the specified frequencies are simultaneously received from line 130 and actuate two of the detector circuits. If only one of the sections of the cathode-follower tubes has its cathode at a relatively high voltage indicating a received signaling pulse of a single frequency, the voltage applied to the control elements of tubes 902 and 903 does not rise to a sufficiently high voltage to initiate a discharge through the left-hand section of tube 902 consequently no pulse is applied to the control grid of tube 904.

If the cathodes of three or more of the cathode-follower sections of tubes 901, 911 and 921 rise to a high positive voltage indicating that three of the detector circuits are simultaneously responding to received signals, then a sufficiently high voltage is applied to the grids of the left-hand sections of both tubes 902 and 903 so that the discharges in both of these tubes are transferred from the right-hand sections to the left-hand sections of these tubes. Under these conditions, due to the summing action of resistors 912 and 913 substantially no voltage change is applied to the control grid of tube 904.

Assume now for purpose of illustration that two and only two of the detector circuits simultaneously respond to received signals indicating that two and only two frequencies are simultaneously present in the received signal. The transfer of the discharge from the right-hand to the left-hand section of tube 902 with the discharge continuing through the right-hand section of tube 903 applies a positive pulse to the grid of tube 904. The application of a positive voltage pulse on the grid of tube 904 at this time causes a negative pulse to be repeated in its output circuit. This negative pulse is applied to the right-hand grid of tube 907. Tube 907 has both sections connected in a single cycle multivibrator circuit in which the right-hand side is normally conducting. Consequently, the application of a negative pulse to this grid interrupts a current flowing through the right-hand section of tube 907 and causes a flow of current through the left-hand section to be initiated. Consequently, a voltage of the anode of the left-hand section of tube 907 falls to a relatively low value.

The anode of the left-hand section of tube 907 is coupled to the grid of tube 906 which tube operates as a cathode-follower and repeats and negative pulse to the stepping lead of the steering circuit shown at the bottom of Fig. 10. The condenser 909 together with the resistors 1066 are of such values that the voltage pulse from the cathode of tube 906 is in effect differentiated so that short negative pulses are applied to the lower or No. 1 grids of tubes 1052, 1053 and 1054. Inasmuch as these tubes are gas tubes they do not respond to negative pulses.

In addition, the anode of the left-hand section of tube 907 is coupled to the screen or second grid of tube 908 through one of the elements of a network of summing resistors and applies a negative pulse to this grid, thus preventing any discharges from being initiated through the gas conduction tube 908 at the termination of the "look" pulse as described hereinafter.

As described herein, during the blank interval between complete code groups of pulses the discharge in tube 773 is transferred from the right-hand section to the left-hand section with the result that a positive pulse was applied over conductor 790 which conductor extends through Figs. 8 and 9 and through to the coupling network comprising condenser 1001 and resistors 1002 and 1003 to the lower or No. 1 grids of tubes 1051 and 1060. The resistors 1002 and 1003 form a voltage divider and apply a portion of this pulse to the No. 1 or control grids of these tubes. The magnitude of the resistors of this divider are proportioned so that the magnitude of this pulse as applied to these control grids is insufficient by itself to initiate discharges within the tubes. At this time the voltage applied to the screen or No. 2 grid of tube 1060 is not sufficient to permit the initiation of a discharge through this tube in response to the application of the pulse to its No. 1 or control grid, because no discharge is flowing in tube 1054. Under the assumed conditions, no discharges are flowing through any of the tubes 1051, 1052, 1053 and 1054. Consequently, no discharge current flows through the anode resistor 1007. Consequently, the voltage divider 1005 applies sufficient voltage to the second control grid of tube 1051 so that a discharge will be initiated through this tube in response to the first pulse applied to conductor 790 when the first long pause or blank interval between groups of pulses representing a complete subscriber's station designation is received. The discharge current flowing through tube 1051 causes the cathode condenser 1071 to become charged to a relatively high positive voltage which voltage is applied through a summing resistor to a starting anode of each of the register tubes 1010, 1011, 1012, 1014 and 1017. A portion of the voltage of the cathode of tube 1051 is applied to the voltage divider resistance 1081 to the second or upper control grid of tube 1052.

The cathodes of the cathode-follower tubes 901, 911 and 921 are connected through summing resistances to the respective register tubes as shown in the upper portion of Fig. 10. Consequently, with a voltage applied through the summing resistances to the upper row of tubes due to the discharge current flowing through tube 1051 and the application of positive voltage from the cathodes of some two of the sections of tubes 901, 911 and 921 to the starting anodes of the tubes of two of the vertical rows, discharges will be initiated through the corresponding two tubes of the first horizontal row from the top of Fig. 10, thus registering the identity of the numeral or digit represented by the received pulses.

Thus, upon the reception of the first set of pulses following the blank interval the circuits respond as described above and during the time a discharge is transferred from the left-hand to the right-hand section of tube 873 the identity of the two component alternating currents of received pulses are determined and discharges initiated through register tubes representing the identity of the numeral or character represented by these pulses. At the conclusion of the 1-millisecond time interval the discharge through the sections of tube 873 is transferred so that the left-hand section again starts to conduct current and the discharge through the right-hand section interrupted. As a result, a negative pulse is applied through the coupling condenser 877 to the grid of the left-hand section of tube 874, thus interrupting the discharge current flowing through this section and initiating a flow of current to the right-hand section of tube 874. The interruption of current flowing through the left-hand section of tube 874 causes its anode to rise to substantially the anode supply voltage and apply a corresponding positive voltage over conductor 882 to the grid of the left-hand section of tube 860. This tube repeats the high positive voltage to the grids of the right-hand sections of tubes 840, 847, etc. and restores the anodes of all of these tubes to substantially the cathode voltage as determined by tube 862 as described hereinbefore.

The transfer of discharges within the sections of tube 873 causes the voltage of the anode of the left-hand section to fall to a relatively low value which voltage in addition to transferring the discharges within tube 874, as described above, is repeated by the right-hand section of tube 860 which operates as a cathode-follower and reduces the voltage applied to the left-hand grids of tubes 850 through 857, etc., through the coupling networks 818 and 819. The reduction of the voltage through these coupling networks together with the restoration of the voltage of the anodes of tubes 840 through 847 to the voltage of the cathodes of the right-hand sections as determined by tube 862 causes the discharge within two of the tubes 850 through 857 which had transferred from the left-hand section of these tubes to the right-hand section to be now transferred back to the left-hand section. Consequently, a positive voltage is removed from the grids of two of the cathode-follower sections of tubes 901, 911 and 921 thus restoring all the cathode-follower tubes to their initial condition which in turn restores the discharge within tube 902 to its initial condition. The discharges, however, continue to flow through tubes of the first row of register tubes of Fig. 10.

The transfer of discharges within tube 873 at the termination of the "look" pulse causes the anode of the right-hand section to rise to substantially anode supply voltage. This voltage is applied over conductor 884 to the control grid of tube 861 which tube operates as a cathode-follower and applies a high voltage to the lower or control grid of tube 908. This voltage, however, is insufficient of and by itself to initiate a discharge through this tube. Inasmuch as the discharges within tube 907 have been previously transferred so that the anode of the left-hand section is of relatively low voltage as described hereinbefore a corresponding low voltage is applied through the summing resistor to the upper or second grid of tube 908. Consequently, the voltage applied to this grid is insufficient to permit a discharge to be initiated through tube 908 upon the application of the positive pulse from the cathode of tube 861 to the lower or No. 1 grid of this tube. Consequently, no discharges are initiated through tube 908 at this time.

Some time after the termination of a positive pulse applied through the differentiating coupling network to the lower or control grid of tube 908, the discharges within tubes 907 are restored to their initial condition, that is, a discharge is initiated through the right-hand section of tube 907 and the discharge through the left-hand section interrupted. As a result the voltage of the anode of the left-hand section rises to substantially anode supply voltage and applies a higher voltage through the summing resistor to the second grid of tube 908. The pulse applied to the first grid, however, has terminated so no discharges are initiated through tube 908 at this time. The rise in anode voltage of the left-hand section of tube 907 is also repeated by the cathode-follower tube 906. This voltage is, however, differentiated by the condenser 909 and resistors 1066 with the result that a positive stepping voltage pulse is applied to the steering circuit shown in the lower portion of Fig. 10. At this time, tube 1052 is the only tube in the steering circuit shown in the lower portion of Fig. 10 which has a more positive voltage applied to its upper or second grid due to the high voltage on the cathode of tube 1051. Consequently, a discharge is initiated through tube 1052. The discharge current flowing through tube 1052 at this time causes an additional voltage drop across the common anode resistor 1007 so that the voltage of the anode of tube 1051 falls below the voltage of the cathode of this tube which cathode voltage is maintained at a relatively high voltage for a short interval of time due to the charge on condenser 1071. Consequently, the discharge flowing through tube 1051 is interrupted and a discharge initiated through tube 1052. The transfer of a discharge from tube 1051 to tube 1052 removes the activating potential through the summing resistors applied to the starting electrodes of the first row of tubes of Fig. 10 and applies a corresponding voltage to the starting electrodes to the tubes of the second row of tubes of Fig. 10, thus conditioning the second row of tubes to respond to and register the identity of the second numeral or digit of a subscriber's station identification when it is received and checked in the manner described hereinbefore.

The above described process is thus repeated for each of the signaling pulses comprising a pair of frequencies representing the identity of each of the succeeding numerals or digits of a called station designation. A gas tube similar to tubes 1052, 1053, etc. is provided for each of these numerals or digits and a row of tubes in the register circuit similar to tubes 1010, 1011, 1012, 1014 and 1017 are likewise provided to register representations of the identity of each of the digits. While only three rows are shown in Fig. 10, as many rows of tubes may be provided as desired, to register numerals or digits of a calling designation for use at any particular switching station or center.

In the arrangement shown in Fig. 10 at the completion of the registration of the third numeral, a discharge is initiated through tube 1054. The discharge continues thereafter to flow through tube 1054 until a blank signal is received indicating the termination of one series of pulses representing a subscriber's station designation and indicating that any further pulses subsequently received must be the beginning of another repetition of the same series of pulses. At this time, the discharge current flowing within the right-hand section of tube 773 is again transferred to the left-hand section of this tube with the result that another positive pulse is applied to the conductor 790. This pulse is transmitted through the differentiating condenser 1001 and resistors 1002 and 1003 to the lower or control grids of tubes 1051 and 1060. At this time, however, a discharge current is flowing through tube 1054 with the result that an appreciable voltage drop exists across the resistor 1007 which voltage drop is sufficient to reduce the voltage applied from the voltage dividing resistors 1005 to the upper or second control grid of tube 1051 so that a discharge will not be initiated through tube 1051 upon the application of the second positive pulse to conductor 790.

At this time due to the discharge current flowing through tube 1054 the cathode of tube 1054 is at a relatively high positive voltage so that a sufficiently high positive voltage is applied to the second or upper control grid of tube 1060 to condition the tube to have a discharge initiated within the tube in response to the second application of a positive pulse over the conductor 790 from the anode of the right-hand section of tube 773. It is to be noted that since no discharge current is flowing through tube 908 a relatively high voltage is applied from the anode of this tube through a summing resistor to the upper or second control grid of tube 1060. This positive voltage together with the positive voltage from the voltage divider network connected to the cathode of tube 1054 raises the voltage of the second grid of tube 1060 so that a discharge is initiated through this tube upon the second application of a positive pulse to conductor 790. The discharge current flowing through tube 1054, however, is not interrupted at this time.

The initiation of a discharge through tube 1060 indicates the satisfactory completion of the registration of all of the numerals or digits of a subscriber's designation necessary at a given control center.

The initiation of a discharge through tube 1060 causes current to flow over conductor 1068 which extends through Figs. 9, 8 and 7 to ground through the winding of relay 218. As a result, the cathode of tube 1060 rises to a positive voltage with respect to ground, which voltage is applied over conductor 1067 and through resistor 914 to the grid of tube 905. As a result tube 905 becomes conducting and lowers the voltage of the second grid or screen of tube 908 so that the application of a positive voltage to the first or lower grid of this tube as shown in Fig. 9 is unable to initiate a discharge through the tube. Thus no discharges can be initiated through tube 908 due to improper reception of subsequent signals during the time required for the operation of relay 218.

The initiation of a discharge through tube 1060 completes the above-described circuit for operating relay 218 which relay in turn operates and applies ground to the junction between resistors 770 and 771 thus removing the anode potential from tube 765 and preventing further discharges through this tube.

The operation of relay 218 also interrupts the above-described circuit for operating relay 216, which relay releases and in turn disconnects the transformer 617 of the incoming amplifier from the incoming signaling conductors 130 and reconnects the signaling conductors 130 to terminating resistance 214. The release of relay 216 also applies ground to the junction between resistors 770 and 771 thus preventing any discharges through tube 765 until relay 216 is reoperated.

The operation of relay 218 also completes a circuit for the operation of relay 625 which circuit extends from ground through the winding of relay 625, the upper operated contacts of relay 218 to battery through the lower right-hand break contacts of key 217. Relay 625 is slow in operating so that the relays 650, 651 to 677 have sufficient time to become fully operated before relay 625 operates.

The relays 650, 651 and 677 have the windings connected between ground and the cathodes of the register tubes 1010 through 1037. One of the relays 650, 651, 677, etc. is provided for each of the register tubes 1010 to 1037. When a discharge is initiated through any of these register tubes as described above, the corresponding relays 650, 651 and 677 are operated. At the completion of the registration of a complete subscriber's designation as described above, the last one of the relays 650 through 677 will be operated. After ample time has elapsed for the operation of these relays, relay 625 operates and connects battery from the lower right break contacts of key 217 and the upper operated contacts of relays 218 and 625 to a series checking circuit through the lower contacts of the relays 650, 651, 677 etc., and the upper transfer contacts of keys 680, 681, 687 etc. The checking circuit extending through the relay and key contacts is arranged so that if the relays 650, 651 and 677 are actuated in the same pattern as the corresponding keys, then a circuit is completed for the operation of the O. K. message register 233. If, on the other hand the relays 650, 651, 677 etc. are not operated in the same pattern as the keys 680, 687 etc. then a circuit is completed for the operation of the error message register 234.

The checking and comparing circuits through the key contacts 680, 681, and 687, and the relays 650, 651 and 677 are provided for checking and comparing and testing purposes where it is known what the received code combinations are or should be. Such test arrangements are frequently employed in checking the operation of the circuits.

When it is desired to control switching circuits by means of the improved signaling system described herein, relays 650, 651 and 677 will be provided with other contacts for controlling the switching circuits or else additional relays similar to these relays will be provided, which relays in turn will be actuated from the register tubes in any suitable manner which manner, for example, may be analogous to the manner in which relays 650, 651 and 677 are operated.

Two groups of lights are provided, one controlled by the keys 680, 681 and 687 and the other group controlled by the relays 650, 651, 657 etc. These lights are lighted in obvious circuits under control of the corresponding keys and relays, thus giving a visual indication of the correspondence or non-correspondence between the setting of the keys and the registration of the received signals in the register.

With the control key 217 set in the neutral or manual condition, the circuits then remain in the above-described condition until the operator or attendant actuates the key 217 to momentarily interrupt the right-hand contacts which removes battery from the register and steering circuit and thus restores the receiving equipment to its initial condition, whereupon the above-described operation is repeated, and a subsequent group of signals recorded in the manner described above.

If the control key 217 is set in the automatic position then the release of relay 216 as described above causes the release of the register 229 and upon the operation of relay 625, a circuit is completed for operating either the O. K. register 233 or the error register 234. The release of the call register 229, together with the operation of either the O. K. register 233 or the error register 234 completes the circuit for the operation of the reset relay 630.

The circuit for operating relay 630 extends from battery to the lower left-hand operated contacts of key 217 which contacts are operated when the key is set in the automatic position, the winding of relay 630 to ground through the operated contacts of the O. K. register 233 or else to ground through the break contacts of key 232 and the operated contacts of the error register 234. The operation of relay 630 removes battery from the register tubes of Fig. 10 as well as the steering circuit shown at the bottom of this figure. Thus the discharges through these tubes are all interrupted and relays 650, 651 and 677 released so that either the O. K. or the error register 233 or 234 is also released with the result that relay 630 then releases and conditions the circuit for responding to a succeeding group of signals in the manner described hereinbefore.

In the foregoing description it was assumed that each of the pulse groups comprises currents of two component frequencies simultaneously transmitted so that discharge in the tube 902 is transferred from its right-hand section to its left-hand section, while the discharge in tube 903 will not be so transferred.

For the purpose of illustration it is now assumed that some one of the pulses or pulse groups comprises three frequencies or that noise or other interference becomes operative so that currents continue to flow in three or more of the resonant circuits of Fig. 7 after the termination of the received pulse. Consequently, when the discharge within tube 873 is transferred at the beginning of the "look" pulse the voltage of the anode of the normally conducting left-hand section rises to substantially the voltage of the anode supply voltage source. This high positive voltage is repeated by the right-hand section, of tube 860 to the right-hand grids of the differential amplifier tubes 850, 857, etc. As a result of the discharges within three or more of the differential amplifier tubes 850, 857, etc. is transferred from the right-hand sections to the left-hand sections so a discharge of current will flow through three or more sections of tubes 900, 901 and 921 and cause substantially the simultaneous transfer of discharges within both tubes 902 and 903. As a result, the voltage of the mid-point between the summing resistors 912 and 913 remains substantially constant. Consequently, no pulse is repeated through tube 904 and the discharge within the tube 907 is maintained with the right-hand side conducting and the left-hand section non-conducting. Consequently, the anode of the left-hand section of tube 907 is of a relatively high positive voltage, which voltage is applied to one of the summing resistors connected to the upper or second grid of tube 908 as shown in the drawing. This time, it is assumed that a discharge will be flowing through one of the tubes 1051, 1052, 1053, 1054, etc., with the result that there is a voltage drop across resistor 1007 so the voltage of conductor 1070 is at a relatively low value. In addition, no discharge flows through tube 1060 at this time so that the voltage applied to the conductor 1067 is likewise relatively low. When the voltage from the cathode of tube 1060 is relatively low and the voltage on conductor 1070 also relatively low, no current flows in the anode cathode path of tube 905. Consequently, a relatively high voltage is applied to the summing resistor connected to the upper or second grid of tube 908.

Then at the end of the look pulse, the discharge through tube 873 is transferred back from the right-hand section to the left-hand section as described above whereupon the bias voltage applied to the left-hand grids of tubes 850, 857, etc. is reduced so that discharges through the tubes were transferred back to the right-hand sections. In addition, the interruption of the discharge through the right-hand section of tube 873 causes the anode of this section to rise to substantially the anode supply voltage which voltage is transmitted over conductor 884 to the control grid or element of tube 861. Tube 861 operates as a cathode follower and repeats a high positive voltage to its cathode circuit. The voltage is then transmitted to the inner or control grid of tube 908. Under these circumstances the voltage applied to the control grid, together with the positive voltages applied to each of the upper two summing resistors connected to the second or upper grid of tube 908 are sufficient to initiate a discharge through tube 908 indicating an improper response of applicants' system. It should be noted that had a proper number of the resonant circuits had current continuing to flow therein, then only tube 902 would have a discharge transferred within its section and cause a discharge within tube 907 to be transferred. As a result, the voltage of the anode of the left-hand section would fall to a relatively low value and thus be insufficient when applied to the summing network of tube 908 to initiate a discharge through the tube 908. Assuming as above, that three or more frequencies are received as a code group, then at the end of the look pulse when the discharge within the tube 873 is transferred back from the right-hand sections to the left-hand section, positive voltage is applied to the inner or control grid of tube 903 thus initiating a discharge through this tube. As a result, the voltage of the anode of this tube falls to a relatively low value and applies a correspondingly low value voltage through one of the summing resistors to the upper or second grid of tube 1060. Thereafter, a discharge will not be initiated through tube 1060 the next time a positive pulse is applied to conductor 790. In addition, the blocking of tube 1060 prevents false operation of the circuits during the operate time of the various relays.

Initiation of a discharge through tube 908 also completes a circuit from ground through the cathode of tube 908, the anode of the tube 908, then over conductor 916 to battery through the winding of relay 626 and the upper right-hand contacts of key 217. Relay 626 operates and completes an obvious circuit for operating the recycle register 231 and in addition, removes battery from the register and steering circuits thus causing these circuits to be released. Relay 626 in operating completes an obvious circuit for maintaining itself operated under control of the recycling register 231. Upon the operation of relay 231 an obvious shunt circuit is connected around the winding of relay 626 thus causing this relay to release. The release of relay 626 in turn releases the message register 231 and reconnects battery to the register and steering circuits. These circuits, being now restored to their initial condition, are ready to respond to a succeeding series of pulses.

Had only one signal been received instead of three in any pulse interval, then neither tubes 902 nor 903 would have discharges shifted within them so that under this condition also tube 904 would not receive a positive signal, just as was the case for three received signal components. The ensuing action in the rest of the circuit will be the same as that previously traced out and the result will be operation of relay 626, and the clearing of the registers to prepare them for another attempt at correct registration.

Although an exemplary specific embodiment of this invention has been shown and described herein, it will be understood that modifications may be made therein without departing from the scope and spirit thereof as defined by the appended claims.

What is claimed is:

1. In a signaling system in combination, a plurality of resonant circuits, each resonant at a different frequency, means for selectively energizing said resonant circuits, a transmission path, means for transmitting signals over said path derived from energized ones of said resonant circuits, a receiving circuit including a similar plurality of similar resonant circuits, means for conveying signals from said path to said resonant circuits, control means for operatively disassociating said pluralities of resonant circuits a predetermined interval of time after a circuit of said first set is selectively energized and registering equipment responsive to currents flowing in said receiving resonant circuit after said predetermined interval of time.

2. In combination, a signaling system comprising a plurality of transmitting resonant circuits, each resonant at a different frequency, a similar plurality of receiving resonant circuits, means for operatively conveying signals from said transmitting circuits to said receiving circuits, means for selectively energizing individual ones of said transmitting resonant circuits, apparatus for preventing the conveyance of signals to said receiving circuits after a predetermined interval of time, register means responsive to the electrical condition of said receiving resonant circuits after said predetermined interval of time.

3. In a signaling system in combination, a plurality of transmitting resonant circuits, a corresponding plurality of receiving resonant circuits, means for interconnecting said receiving resonant circuits with said transmitting resonant circuits including an electrical transmission path, apparatus for selectively energizing said transmitting circuits and restoring means for stopping the flow of resonant currents in said transmitting circuits after a predetermined interval of time and apparatus responsive after said predetermined time interval to currents flowing in said receiving resonant circuits interconnected with said receiving resonant circuits.

4. In a signal receiver in combination, means responding to pulses of a plurality of different currents of different frequencies comprising a resonant network for each of the different frequencies having a damping constant related to the signaling currents, means for suppressing the signaling current after a predetermined interval of time and apparatus responsive to the electrical condition of said networks after said signaling currents are suppressed.

5. In a signaling system, a signal receiver comprising a plurality of resonant networks, means for conveying signaling currents of different frequencies to said networks causing currents to flow in said resonant networks, apparatus for responding to the current flowing in said networks, bias means for said apparatus controlled by the maximum magnitude of current flowing in said networks in a predetermined interval of time, and means responsive to currents substantially equal to or greater than said maximum current flowing in said networks after said bias means have been controlled by said maximum current.

6. In combination, in an electrical signaling system, a plurality of transmitting resonant circuits, each resonant at a different frequency, a similar plurality of receiving resonant circuits, transmitting means for electrical transmission interconnected between said transmitting resonant circuits and said receiving resonant circuits for operatively conveying signals from said transmitting resonant circuits to said receiving resonant circuits, means for selectively energizing individual ones of said transmitting resonant circuits, timing means for timing an interval of time which interval of time is an integral number of cycles of each of the frequencies to which said resonant circuits are resonant, apparatus connected between said timing means and said transmitting resonant circuits for deenergizing the energized ones of said transmitting resonant circuits at the end of said time interval and recording means interconnectable with said receiving resonant circuits and apparatus for operatively connecting said recording means to said receiving resonant circuits after the end of said time interval.

7. In a signaling system comprising in combination, a transmitting station, a plurality of electrically resonant circuits, each resonant at a different frequency at said transmitting station, control means at said transmitting station interconnected with said resonant circuits for selectively energizing said resonant circuits, deenergizing means for deenergizing energized ones of said resonant circuits at the end of a predetermined time interval, which time interval is an integral number of cycles of each of the frequencies of said resonant circuits.

8. In an electrical signal receiving system, means responsive to received pulse signals of alternating current including an electron discharge device, bias means for said electron discharge device, apparatus controlled by the amplitude of each received pulse signal for controlling the said biasing means during reception of said pulse signal and means for responding to said pulse signal after said biasing means has been set by said pulse signal.

9. In alternating-current signaling system, receiving means responsive to received signals for identifying different frequencies of received signals comprising a plurality of resonant circuits, each resonant at a different one of a plurality of frequencies, electronic means for applying received signals to said resonant circuits, means for suppressing the alternating currents supplied to said circuits at the end of a predetermined time interval, and apparatus responsive to currents flowing in said resonant circuits at the end of a further predetermined time interval.

10. In a signaling system, receiving means for identifying each of a group of received alternating currents having different frequencies comprising a plurality of resonant circuits, each of which is resonant at a different one of said plurality of frequencies, electronic means having low output impedance connected to said resonant circuits for supplying alternating-current energy to said resonant circuits but preventing substantial coupling between said resonant circuits, means for supplying said received signaling currents of different frequencies to said coupling device for energizing said received resonant circuits and means for suppressing said alternating currents at the end of the time interval which is substantially equal to the reciprocal of the minimum difference in frequencies to which individual resonant circuits are tuned.

11. In combination a signaling system comprising a plurality of transmitting resonant circuits, each resonant at a different frequency, a similar plurality of receiving resonant circuits, means for operatively conveying signals from said transmitting circuits to said receiving circuit, means for selectively energizing individual ones of said transmitting resonant circuits, apparatus for suppressing resonant currents in said energized circuits after a predetermined interval of time which is equal in duration to the reciprocal of the minimum difference of the frequencies to which said circuits are tuned, receiving means for responding to currents flowing in said resonant circuits and apparatus for determining a time interval longer than said transmitting time interval and interconnecting means controlled by said time measuring means for connecting said responsive means to said resonant circuits at the end of said longer time interval.

12. In a signaling system a signal receiver comprising a plurality of resonant networks, means for conveying pulses of signaling currents of different frequencies to said networks causing current to flow in said resonant networks, apparatus for responding to the flow of current in said networks, bias means for said apparatus controlled by the magnitude of current flowing in said networks during an initial predetermined interval of time of each pulse interval, means responsive to currents flowing in said networks after said initial predetermined interval of time and means for preventing operation of said means responsive to said currents when said currents are substantially less than the currents producing said bias.

References Cited in the file of this patent

UNITED STATES PATENTS

| | | |
|---|---|---|
| 1,786,805 | Wensley | Dec. 30, 1930 |
| 2,572,074 | Terry | Oct. 23, 1951 |
| 2,658,189 | Lovell | Nov. 3, 1953 |